(12) United States Patent
Yagita et al.

(10) Patent No.: US 8,711,390 B2
(45) Date of Patent: Apr. 29, 2014

(54) METHOD AND APPARATUS FOR EXECUTING LOAD DISTRIBUTED PRINTING

(75) Inventors: Takashi Yagita, Kanagawa (JP); Masamichi Ohshima, Tokyo (JP); Noriyoshi Kurotsu, Kanagawa (JP); Hidekazu Morooka, Kanagawa (JP); Koichiro Wanda, Kanagawa (JP); Koji Kikuchi, Kanagawa (JP); Kei Kitagata, Kanagawa (JP); Kenichi Shirai, Kanagawa (JP); Hiroyuki Kayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1979 days.

(21) Appl. No.: 10/999,985

(22) Filed: Dec. 1, 2004

(65) Prior Publication Data
US 2005/0141023 A1    Jun. 30, 2005

(30) Foreign Application Priority Data
Dec. 1, 2003  (JP) ................................ 2003-401953

(51) Int. Cl.
*G06F 3/12* (2006.01)

(52) U.S. Cl.
USPC ........... 358/1.15; 358/1.13; 358/1.1; 709/223

(58) Field of Classification Search
USPC ........ 358/518, 3.23, 530, 523–525, 1.13, 1.1, 358/1.14, 1.15; 709/217, 224, 223, 249, 709/238; 700/169, 175, 108, 110
See application file for complete search history.

(56) References Cited

U.S. PATENT DOCUMENTS 6,075,615 A * 6/2000 Nakamura ................... 358/1.14
(Continued)

FOREIGN PATENT DOCUMENTS

| JP | 6-259206 | 9/1994 | ................ G06F 3/12 |
| JP | 09-258931 | 10/1997 | ................ G06F 3/12 |

(Continued)

*Primary Examiner* — Firmin Backer
*Assistant Examiner* — Brendan McCommas
(74) *Attorney, Agent, or Firm* — Fitzpatrick, Cella, Harper & Scinto

(57) ABSTRACT

This invention provides a load distributed printing technique which efficiently uses a plurality of printing apparatuses by using small resources. To accomplish this, an information processing apparatus, which can transmit a print job to a plurality of printing apparatuses, is provided. The information processing apparatus comprises print queue setting means for setting one of a plurality of print queues corresponding to the plurality of printing apparatuses as a basic print queue and setting remaining print queues other than the basic print queue as backup print queues, print job registration means for registering print job information in the basic print queue, backup job registration means for generating backup job information corresponding to the print job information registered in the basic print queue and registering the backup job information in the backup print queue, and job control means for, when the print job information is registered in each of the basic print queue and the backup print queue, preferentially outputting a print job corresponding to the print job information to a corresponding printing apparatus, and when no print job information is registered, and a print job corresponding to the backup job information can be output, changing the backup job information to print job information and outputting the print job to a corresponding printing apparatus.

11 Claims, 19 Drawing Sheets

(56) References Cited

U.S. PATENT DOCUMENTS

| | | | |
|---|---|---|---|
| 6,115,132 A * | 9/2000 | Nakatsuma et al. | 358/1.14 |
| 6,188,487 B1 | 2/2001 | Matsubara | 358/1.15 |
| 6,314,502 B1 * | 11/2001 | Piersol | 711/162 |
| 2002/0030851 A1 | 3/2002 | Wanda | 358/1.15 |
| 2002/0078183 A1 | 6/2002 | Helms | 709/220 |
| 2003/0053106 A1 | 3/2003 | Kuroda et al. | 358/1.13 |
| 2003/0103235 A1* | 6/2003 | Gomi | 358/1.15 |
| 2003/0158932 A1 | 8/2003 | Machida et al. | 709/224 |
| 2003/0174360 A1* | 9/2003 | Ohshima | 358/1.15 |
| 2004/0001215 A1 | 1/2004 | Kurotsu | 358/1.13 |
| 2005/0128505 A1 | 6/2005 | Garcia | |
| 2005/0128512 A1 | 6/2005 | Kurotsu | |
| 2005/0141013 A1 | 6/2005 | Kikuchi | |

FOREIGN PATENT DOCUMENTS

| | | | |
|---|---|---|---|
| JP | 11-53134 | 2/1999 | B41J 29/28 |
| JP | 11-110237 | 4/1999 | G06F 9/46 |
| JP | 2002-163086 | 6/2002 | B41J 29/38 |

* cited by examiner

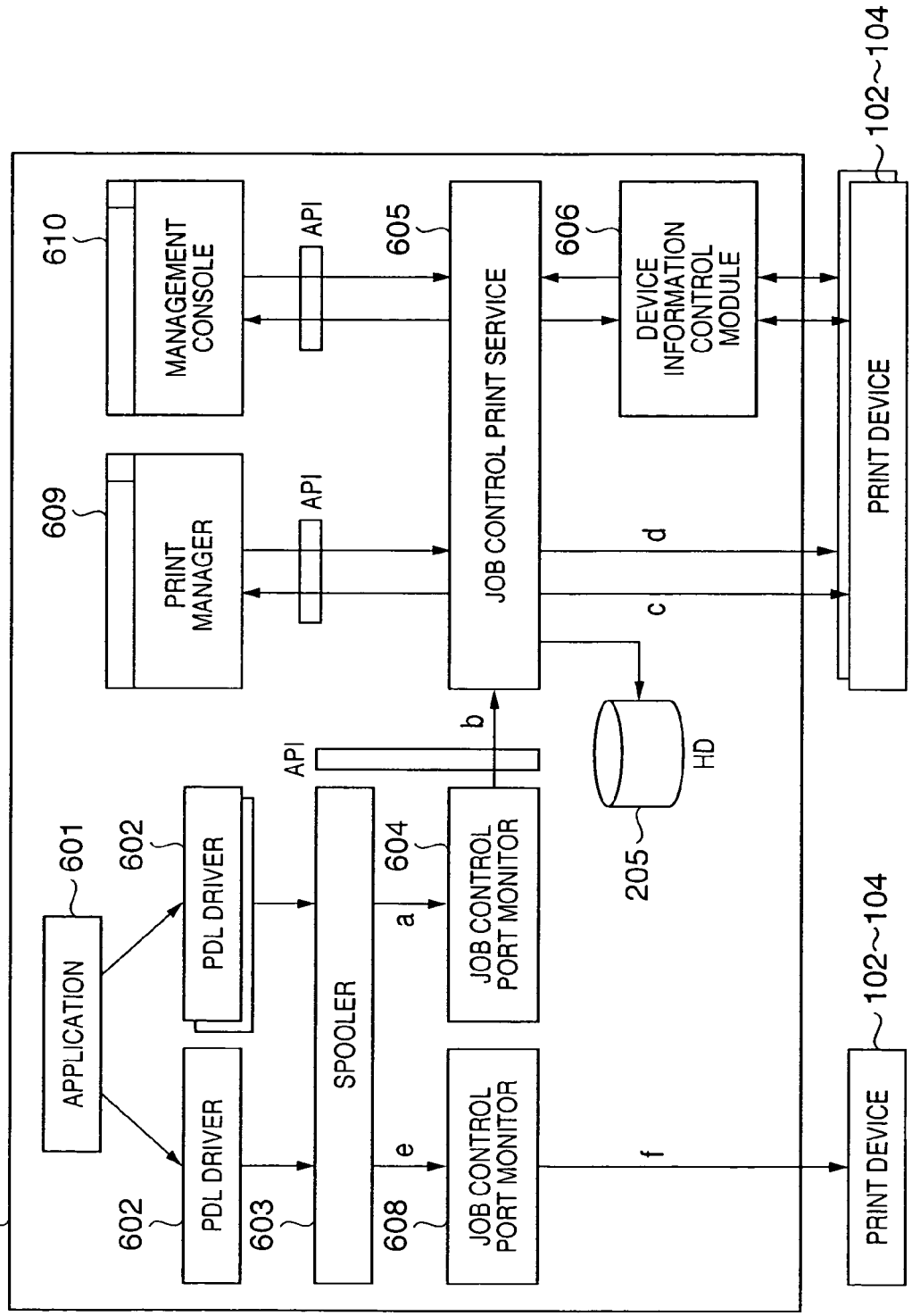

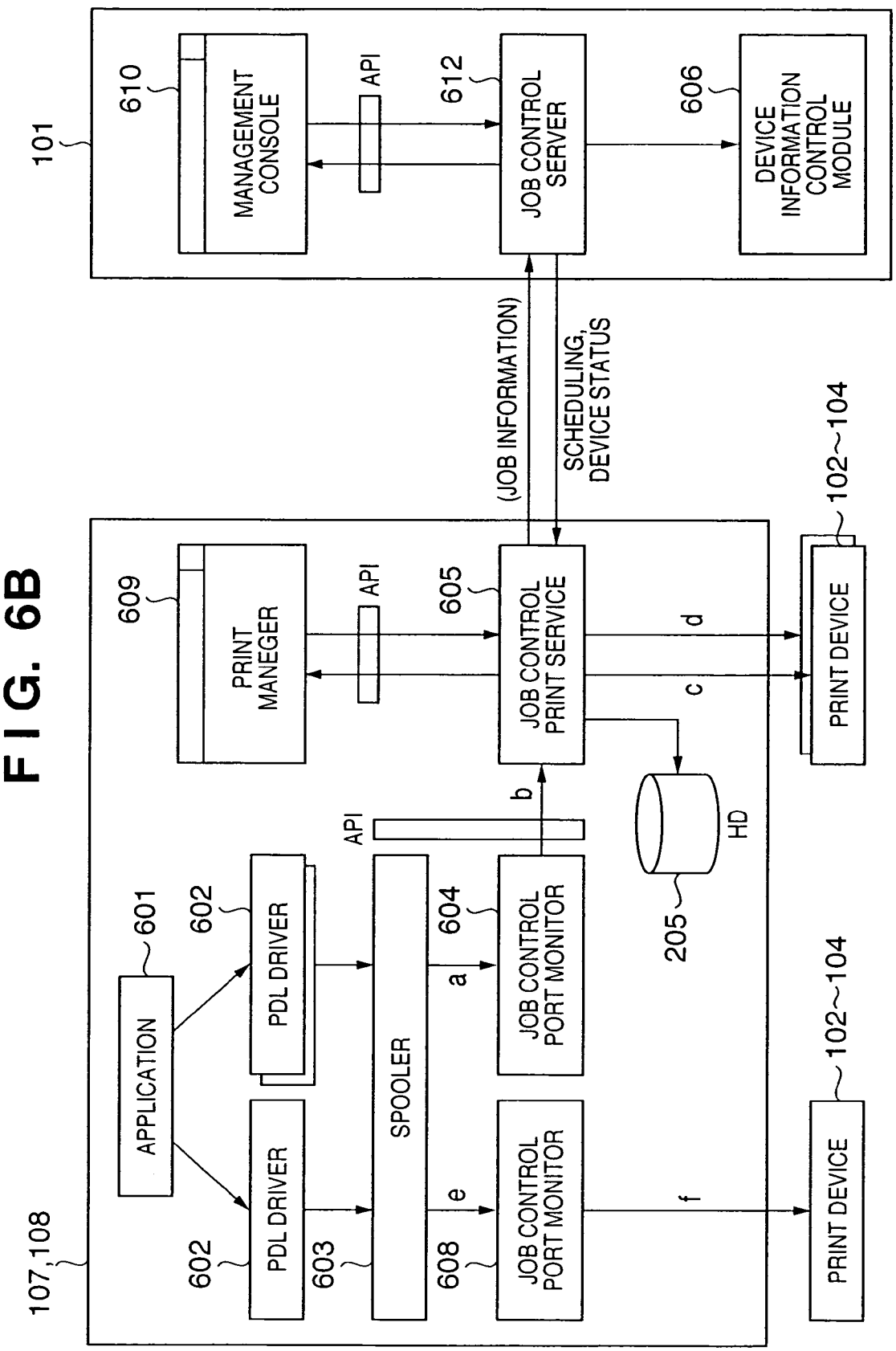

F I G. 9

901

| PRINTER NAME |
|---|
| PRINTER DRIVER NAME |
| PRINT TYPE |
| BACKUP PRINTER NAME 1 |
| BACKUP PRINTER NAME 2 |
| ⋮ |
| BACKUP PRINTER NAME X |
| ⋮ |
| ⋮ |

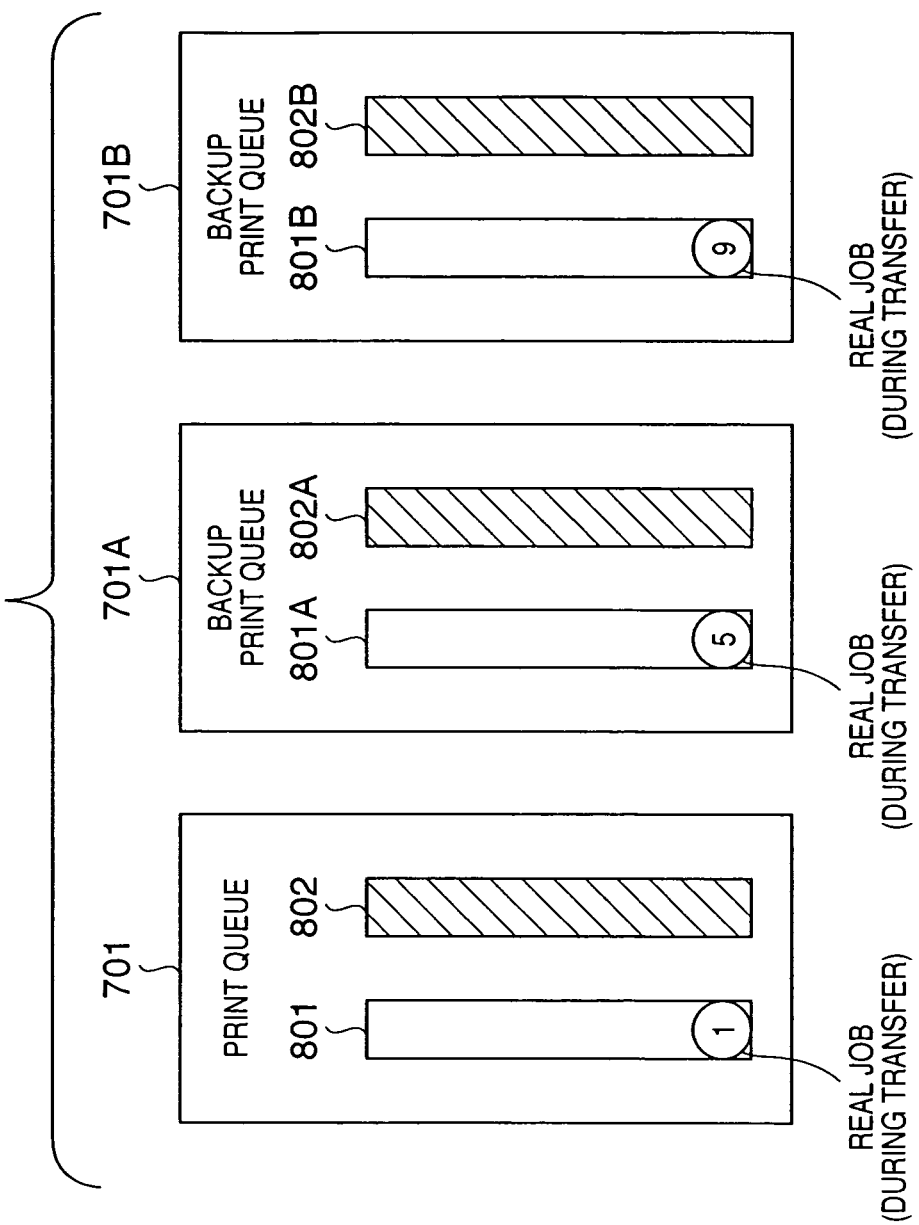

FIG. 18

ADD PRINTER

PRINTER NAME: [_____] ~1801

PORT NAME: [_____]

1806~ [SELECT PORT...] [PROPERTY]

DRIVER NAME: [_____] ~1802

OUTPUT METHOD: [AUTOMATIC "REDIRECT ON ERROR" PRINT ▼] ~1803  [SELECT DRIVER]

BACKUP PRINTER LIST:

[_____] ~1804     1805
                                 [SET BACKUP PRINTER ...]

PRINTER OPTIONS

JOB PRIORITY: [  1  ▲▼] (1~99)

CONDITION FOR "REDIRECT ON ERROR" PRINT:
- [✓] ERROR
- [ ] PORT UNUSABLE
- [ ] NUMBER OF JOBS IN PRINT QUEUE  [  ] PIECES OR MORE
- [ ] SIZE OF JOBS IN PRINT QUEUE  [  ] KB OR MORE

CONDITION FOR SWITCHING TO MANUAL "REDIRECT ON ERROR" PRINT:
- [ ] PAPER OUT
- [ ] PAPER JAM
- [ ] COVER/DOOR OPEN
- [ ] FULL LOAD ON TRAY
- [ ] START JOB IN DEVICE

[OK]  [CANCEL]  [HELP (H)]

METHOD AND APPARATUS FOR EXECUTING LOAD DISTRIBUTED PRINTING

FIELD OF THE INVENTION

The present invention relates to a print processing technique to efficiently use a plurality of printing apparatuses.

BACKGROUND OF THE INVENTION

Conventionally, there exist load distributed printing systems which distribute a printing load to a plurality of inexpensive medium-speed printing apparatuses and cause them to operate in parallel to implement high-speed printing at a low cost instead of executing mass printing by using one high-speed mass printing apparatus when it is necessary to print documents in a large quantity.

When a plurality of printing apparatuses are operated in parallel, the load concentrates at a specific printing apparatus. To solve this problem, various techniques to efficiently use a plurality of printing apparatuses have been proposed (Japanese Patent Laid-Open No. 06-259206).

In a conventional print system represented by patent reference 1, however, identical print data are redundantly registered in a plurality of print queues. The print data registered in a print queue corresponding to a printing apparatus which is set first in the printable state is used while the print data registered in the remaining print queues are deleted. When identical print data are redundantly registered, the resource load for the memory capacity or arithmetic processing is large. In addition, a plurality of identical print data occupy the print queues, although it only temporarily occurs. Since many print jobs are registered in the queues as a whole, print job scheduling is difficult. Furthermore, when the state of print queues is presented to the user, it looks as if the print queues were very congested more than the reality, and the user is confused.

SUMMARY OF THE INVENTION

The present invention has been made to solve the above-described conventional problems, and provides a load distributed printing technique to cause a plurality of printing apparatuses to efficiently execute printing by using small resources.

That is, an apparatus according to the present invention is an information processing apparatus which can transmit a print job to a plurality of printing apparatuses, comprising print queue setting means for setting one of a plurality of print queues corresponding to the plurality of printing apparatuses as a basic print queue and setting remaining print queues other than the basic print queue as backup print queues, print job registration means for registering print job information in the basic print queue, backup job registration means for generating backup job information corresponding to the print job information registered in the basic print queue and registering the backup job information in the backup print queue, and job control means for, when the print job information is registered in each of the basic print queue and the backup print queue, preferentially outputting a print job corresponding to the print job information to a corresponding printing apparatus, and when no print job information is registered, and a print job corresponding to the backup job information can be output, changing the backup job information to print job information and outputting the print job to a corresponding printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWING

FIG. 6A is a block diagram showing an example of the software configuration of the print system;

FIG. 6B is a block diagram showing another example of the software configuration of the print system;

FIG. 9 is a view showing the contents of print queue information;

FIG. 17 is a view showing the relation between the real job, real job queue, virtual job queue, print queue, and backup print queue; and FIG. 18 is a view showing an example of a window to set information about the printer.

DETAILED DESCRIPTION OF THE PREFERRED EMBODIMENT

Figure 1:
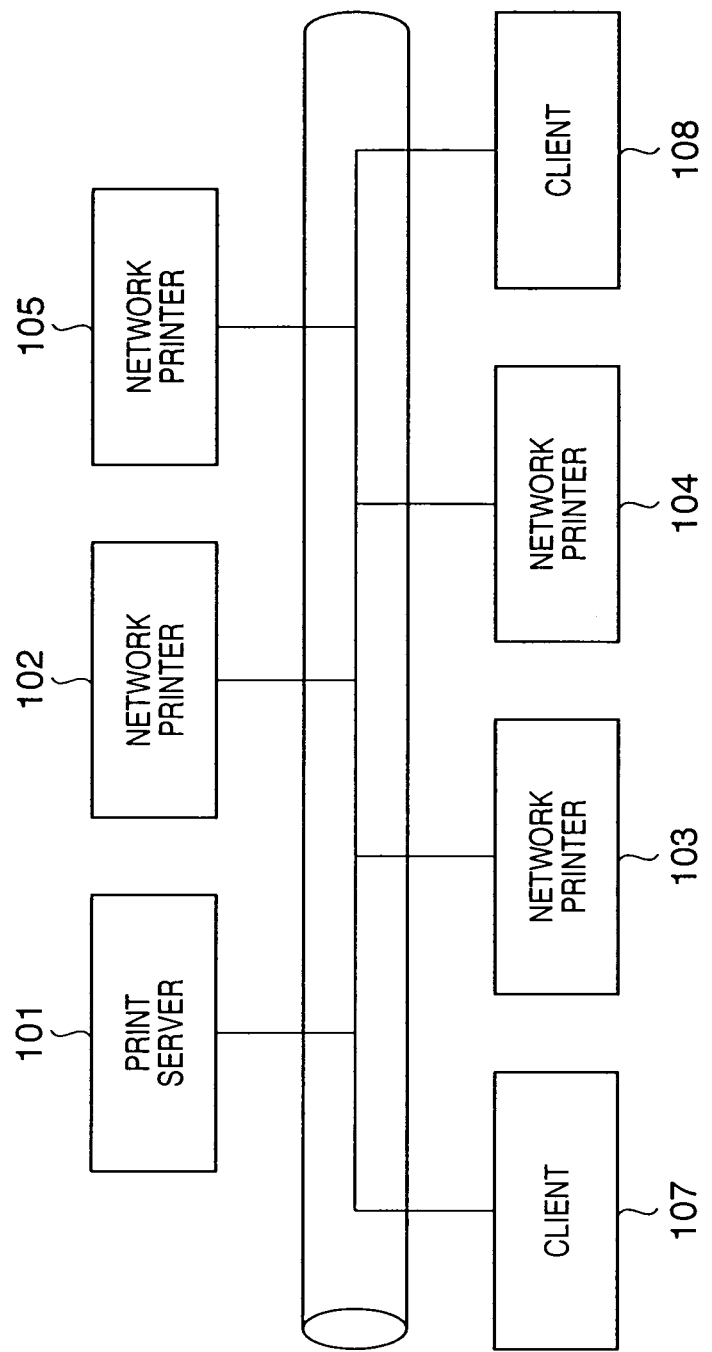
FIG. 1 is a block diagram showing the overall configuration of a print system according to the embodiment of the present invention.

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

In this specification, print data is image data described in PDL or the like. Print job information is information about the printer to which print data should be output, print data storage location, and printing method. A print job is a combination of print data and print job information.

<Outline>

A print system according to this embodiment has no independent shared print queue but only print queues corresponding to print devices, unlike the system disclosed in Japanese Patent Laid-Open No. 06-259206. One of print queues corresponding to a plurality of print devices is set as a basic print queue. The remaining print queues are set as backup print queues. In this embodiment, the basic print queue will be simply referred to as a print queue. The print device corresponding to the basic print queue will be referred to as a load distributed print device. A print device corresponding to a backup print queue will be referred to as a backup print device.

The print job information of a print job generated by a printer driver is preferentially registered in the basic print queue. At the same time, job information as a backup of the print job information is generated in each backup print queue. In this embodiment, the backup job information corresponding to the print job information will be referred to as virtual job information. Normal print job information which is not a backup will be referred to as real job information for comparison. Real job information contains a print data storage location. A virtual job is not directly related to print data and contains identification information (real job ID) of real job information. Hence, real job information can be derived from virtual job information.

All print queues including backup print queues can conceptually be classified into queues (real job queues) for real job information and queues (virtual job queues) for virtual job information. When a user refers to the print queues by a general method to confirm the states of print jobs, the virtual job queues are not displayed on the user interface. Only the real job queues are displayed. Hence, the user can normally recognize only the state of the real job information.

When a load distributed printing instruction is input, print job information contained in the instruction is registered in the real job queue in the print queue as real job information. Virtual job information corresponding to the real job information is generated in the virtual job queues in all the remaining backup print queues. Assume that before all pieces of precedingly registered real job information are transmitted to the corresponding print device in the real job queue in the print queues, the real job queue in one of the backup print queues is vacant. In this case, the virtual job information registered in the virtual job queue in the backup print queue takes over the corresponding real job information and switches to the real job information and is registered in the real job queue. Immediately after that, the real job information is transmitted to the print device together with print data stored at the storage location contained in the real job information.

That is, a print job corresponding to load distributed printing is temporarily registered in the basic print queue and then transmitted to a print device which is set in the printable state at the earliest timing. Hence, load distributed printing can efficiently be performed without redundantly registering a plurality of identical print data.

In the user interface, when a load distributed printing instruction is input, an object indicating print job information appears in the basic print queue of the load distributed print device. After that, it looks as if the print job information moved to the print queue of the backup print device which is set first in the printable state to start printing. That is, the user is not confused because only one object of the print job corresponding to one print data is displayed.

This system can process a plurality of kinds of print jobs. However, some specific kinds of print jobs are not subjected to load distributed printing. For example, a print job called a secure job should not be output to a printer that is not managed by the user for the sake of security. When the printer driver sets secure printing, no virtual job is generated for a corresponding print job. Real job information is registered in only the real job queue of the print queue of a designated print device. In addition, a password needs to be input to the print device in outputting a secure job.

<System Configuration>

FIG. 1 is a block diagram showing the overall configuration of the print system according to the embodiment of the present invention. This print system includes a print server 101 serving as an information processing apparatus, network printers 102 to 105 serving as printing apparatuses (print devices), and clients (computers) 107 and 108. These components are connected to each other to form a network.

An executable print control program is stored in the print server 101. The print server 101 has a function of storing files to be used in the network and a function of monitoring the use state of the network as well as a function of managing the network printers 102 to 105 included in the print system. More specifically, the print server 101 has a function of creating a print job by itself and transferring it to the network printers 102 to 105, a function of receiving print data generated by the client 107, generating a print job containing the print data, and transferring it to the network printers 102 to 105 by scheduling processing, and a function of executing scheduling processing for a print job generated by the client 107 or 108 and spooled in it and instructing the client 107 or 108 to directly transfer the print job to the network printers 102 to 105. The print server 101 need not always be a computer specialized to printer management. A general-purpose computer having a printer management function can be used. The print server 101 may function as a client in relation to the remaining computer.

The network printers 102 to 105 are print devices serving as physical apparatuses which receive a print job containing print data from the print server 101 or client 107, analyze the received print job, and execute printing. As the network printers 102 to 105, all kinds of printing apparatuses including a laser beam printer using electrophotography, an inkjet printer using an inkjet system, and a printer using a thermal transfer system can be employed.

The clients 107 and 108 are computers which function as clients in relation to the print server 101.

Communication between the apparatuses included in this print system may be either wired communication using an Ethernet (registered trademark) cable or wireless communication using a radio wave or light.

<Arrangement of Print Server and Clients>

Figure 2:
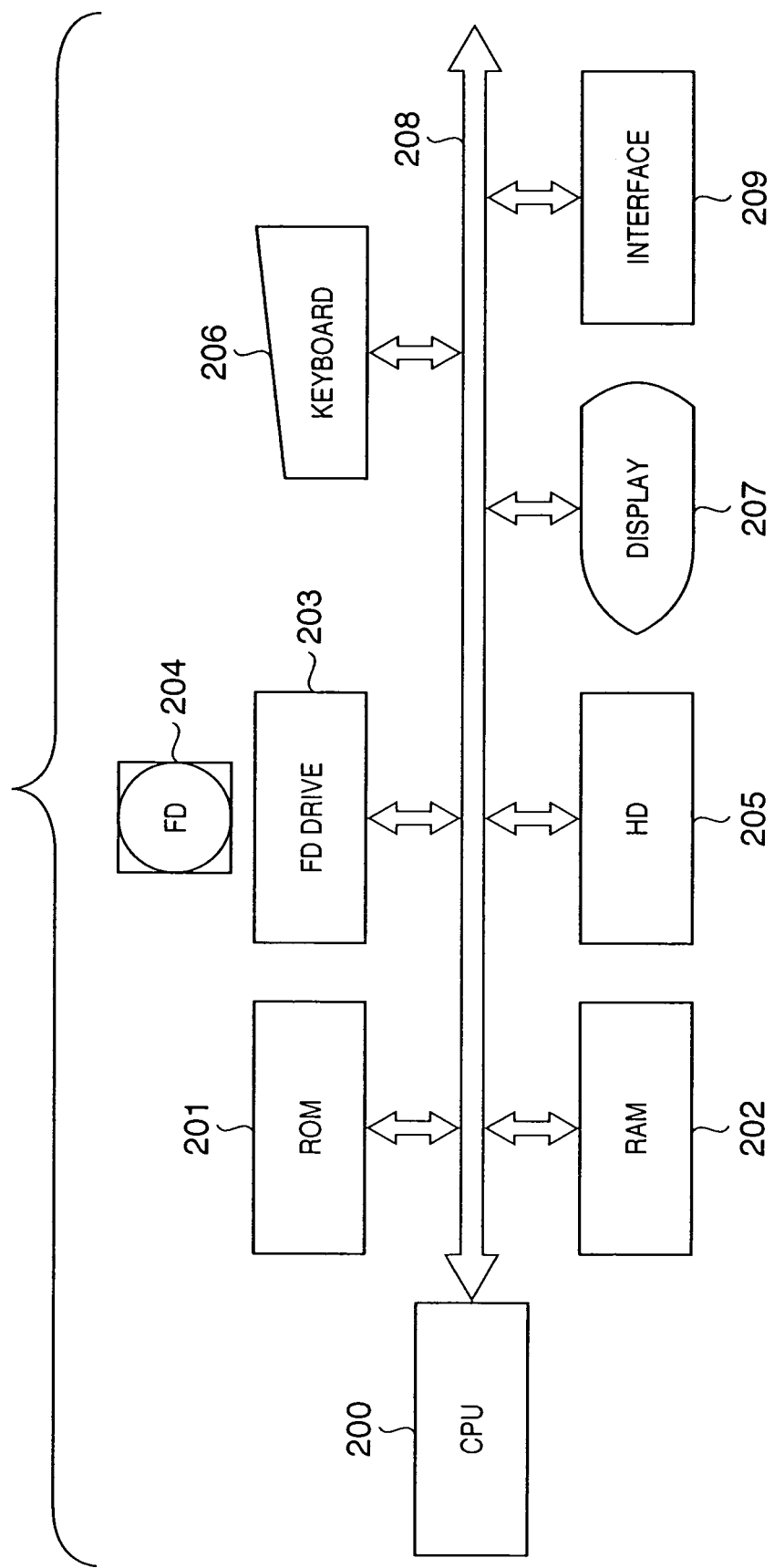
FIG. 2 is a block diagram for explaining the hardware configuration of a server or a client.

FIG. 2 is a block diagram for explaining the hardware configuration of the server 101 and clients 107 and 108 shown in FIG. 1. The print server 101 and clients 107 and 108 have no special difference in hardware configuration. As a representative, the arrangement of the print server 101 will be described.

Referring to FIG. 2, a CPU 200 is a control means for reading out and executing an application program, printer driver program, OS, and print control program stored in an HD (Hard Disk) 205 and temporarily storing information and files necessary for execution of the programs in a RAM 202.

A ROM 201 is a storage means for storing various kinds of data such as programs including basic I/O programs, font data to be used for document processing, and template data. The RAM 202 is a temporary storage means which functions as the main memory or work area of the CPU 200.

Figure 5:
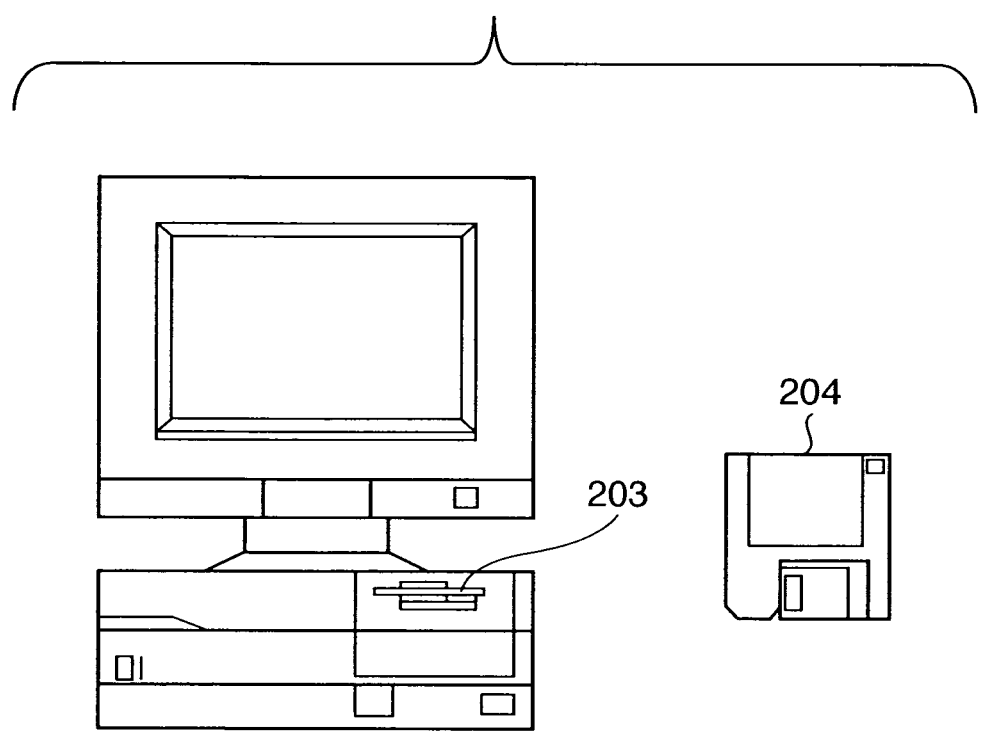
FIG. 5 is a view showing the relationship between an FD drive 203 shown in FIG. 2 and the FD 204 inserted to it.

An FD (Floppy (registered trademark) Disk) drive 203 is a storage medium loading means for loading a program stored in an FD 204 serving as a storage medium to the computer system, as shown in FIG. 5 (to be described later). The print server 101 or client 107 or 108 may have another storage medium loading means in place of or together with the FD drive 203. As another storage medium, any kind of computer-readable storage medium such as a CD-ROM, CD-R, CD-RW, PC card, DVD, IC memory card MO, or memory stick can be used.

The HD 205 is an external storage means which functions as a bulk storage and stores application programs, printer driver program, OS, print control program, and related programs. A spooler serving as a spool means is ensured in the HD 205. In the print server 101, a server spooler is ensured as a spool means. In the client, a client spooler is ensured as a spool means.

A keyboard 206 is an instruction input means from which the user inputs instructions such as a device control command to the print server 101 or client 107 or 108.

A display 207 is a display means for displaying a command input from the keyboard 206 or the states of the printers 102 to 105. Actually, a display instruction is input to the display means through the operating system running on the print server 101 or client 107 or 108. The print processing program inputs a resource file display instruction to the operating system. Accordingly, display to be described later is done. A system bus 208 controls the data flow in the computer, i.e., the print server 101 or client 107 or 108.

An interface 209 is an input/output means. The print server 101 or client 107 or 108 transmits/receives data to/from another apparatus on the network through the interface 209.

<Description of Memory Map>

Figure 3:
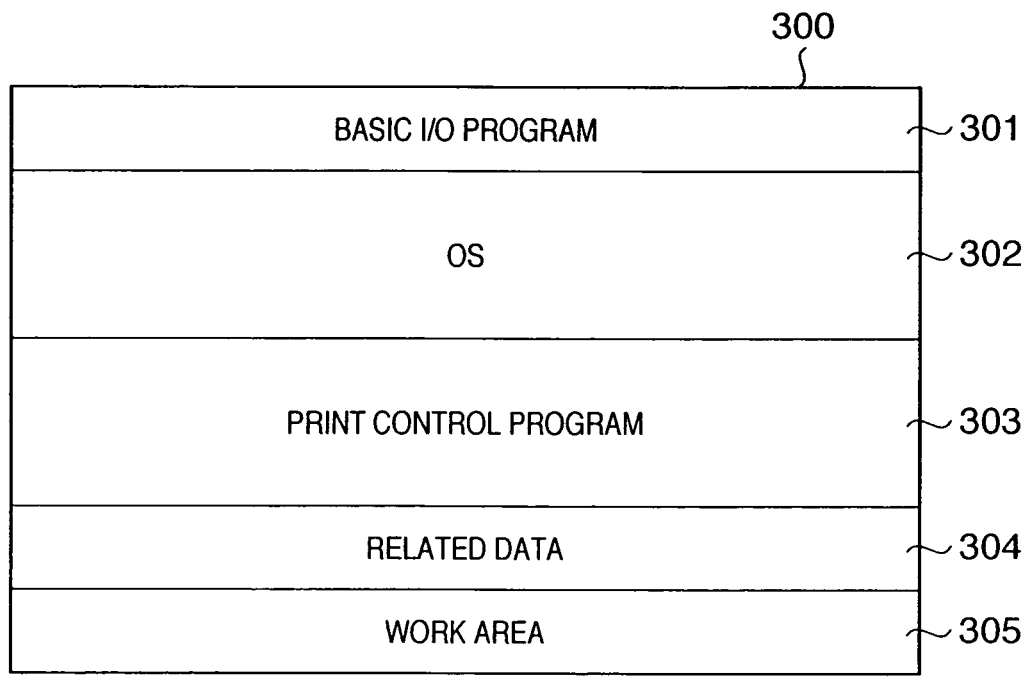
FIG. 3 is a view showing an example of the memory map of a RAM 202 shown in FIG. 2.

FIG. 3 is a view showing an example of the memory map of the RAM 202 shown in FIG. 2. In this memory map state, the print control program is loaded to the RAM 202 and becomes executable. FIG. 5 is a view showing the relationship between the FD drive 203 shown in FIG. 2 and the FD 204 inserted to it. The same reference numerals as in FIG. 2 denote the same parts in FIG. 5. Referring to FIG. 5, the FD 204 stores the print control program and related data.

The print control program and related data may be installed from the FD 204 to the HD 205 in advance and then loaded from the HD 205 to the RAM 202. Alternatively, they may be loaded directly from the FD 204 to the RAM 202 and executed. The print control program may be stored in the ROM 201 as part of the memory map and executed directly by the CPU 200. Software products which implement the same functions as the above-described devices may be used in place of the hardware devices.

In the client, the print control program executes control to instruct a change of a print job printing destination or a change of the sequence of printing. In the print server, the print control program controls the sequence of print jobs or notifies the user of the end of printing of a print job or a printing destination change request. The print control program may separately contain a module to be installed in the client and a module to be installed in the print server. Alternatively, a single print control program may function as a program for the client or a program for print server in accordance with the environment where the program is executed. Both the module having the function for the client and the module which functions for the print server may be installed in one computer and perform pseudo-parallel operations simultaneously or time-divisionally.

An area 301 stores the basic I/O program. The basic I/O program has, e.g., an IPL (Initial Program Loading) function of loading the OS from the HD 205 to the RAM 202 upon power-on of the apparatus (print server 101 or client 107 or 108) and starting the operation of the OS.

An area 302 stores the OS (Operating System). An area 303 stores the print control program. An area 304 stores related data. A work area 305 is an area where the CPU 200 executes various kinds of programs.

Figure 4:
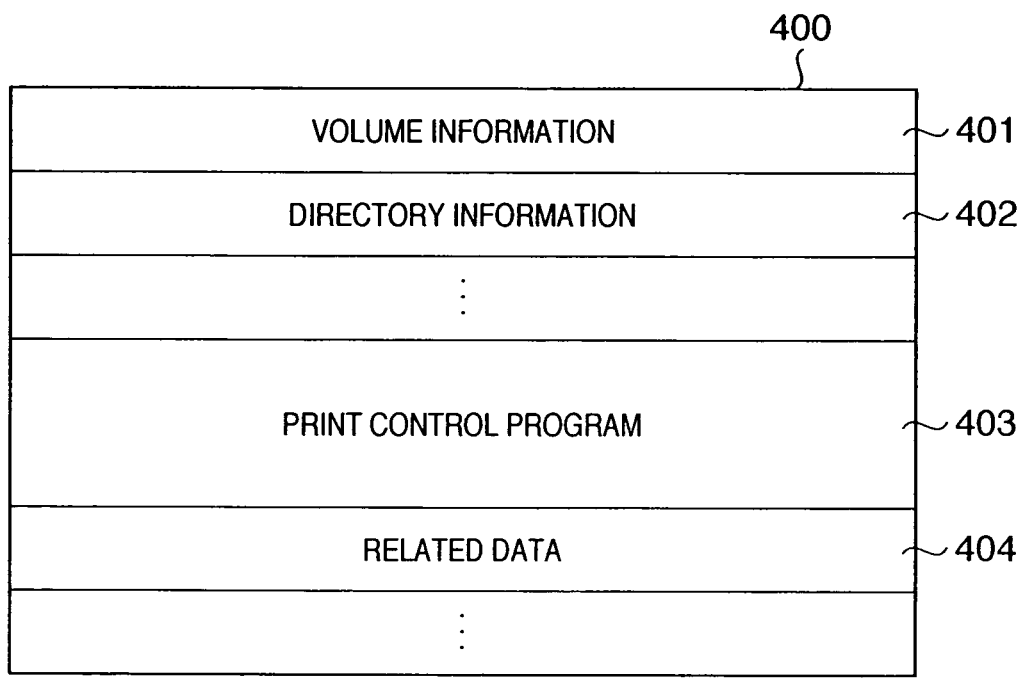
FIG. 4 is a view showing an example of the memory map of an FD 204 shown in FIG. 2.

FIG. 4 is a view showing an example of the memory map of the FD 204 shown in FIG. 2. Referring to FIG. 4, data contents 400 of the FD 204 contain volume information 401 representing the information of data, directory information 402, print control program 403, and related data 404.

<Software Configuration of Print System>

The software configuration of the print system will be described next. FIG. 6A is a block diagram showing an example of the software configuration of the print server 101 or client 107 or 108. Arrows between the components indicate how to process a print job containing a rendering command issued from an application. Software configuration indicated by each block is executed by the CPU 200 shown in FIG. 2 to implement a desired function.

Normally, upon receiving a print instruction, a general application program 601 such as Microsoft Word (registered trademark) generates a series of rendering commands through the OS. A PDL driver 602 receives the rendering commands generated through the OS and generates, on the basis of the series of rendering commands, a print job containing a PDL file which can be interpreted by the network printers 102 to 104. The following description will be done by using the PDL driver as an example. However, the present invention is not limited to this and can also be applied to a printer driver which creates BDL (Band Description Language) or compressed bitmap or a form which causes an application and OS to generate print data without intervening any printer driver.

The PDL driver 602 transfers the generated print job to a spooler 603 to transmit the print job not to a job control port monitor 608 prepared by the OS for print job transmission to a print device but to a job control port monitor 604. The job control port monitor 604 is a module necessary for causing a job control print service 605 to receive the print job. The job control port monitor 608 is a module which transfers print data not to the job control print service but to the print device and is incorporated in the OS. When a print job is output to the job control port monitor 608, the job is not transferred to the job control print service. Instead, the print job is directly transferred to the print device.

In this example, the OS is assumed to be Windows (registered trademark). Hence, the spooler 603 is a Windows spooler. However, the OS of the computer to which the present invention is applied is not limited to Windows. The present invention can also be applied to any other OS having rendering commands, as a matter of course.

The spooler 603 executes procedures of transferring the print job to the port monitor 604 or 608 selected and designated by the user through the user interface and causing the port monitor to transmit the print job to the print devices such as the network printers 102 to 104 (arrow a). In the following description, assume that the user designates the load distributed printing port monitor 604 (to be referred to as a job control port monitor hereinafter) in advance and instructs printing.

Pieces of print setting information such as the paper size and staple instruction set through the printer driver interface are also transmitted to the job control port monitor 604.

The job control port monitor 604 transmits the print job to the load distributed printing print service 605 (to be referred to as a job control print service hereinafter) (arrow b) instead of directly transmitting the print job to the print devices 102 to 104.

The job control print service 605 has a function of managing the transferred print job and device states. Especially when a print device and data transfer source are connected by peer-to-peer to directly output a print job to the print device, the job control print service 605 has a function of managing information such as a device state or a job state notified from the print device or sending a predetermined instruction to the print device. This corresponds to a function of managing the device information or job information of the plurality of network printers 102 to 104. The job control print service 605 transfers a print job whose turn has come to the network printers 102 to 104 on the basis of the print job sequence management function (load distributed printing function) (arrows c and d).

The print job sequence management function implemented by the job control print service 605 will be described here in detail. The sequence management function includes the following functions.

A print queue setting function of setting, of a plurality of print queues corresponding to a plurality of print devices, print queues other than print queues corresponding to print devices set for load distributed printing as backup print queues.

A print job registration function of registering print job information transferred from the job control port monitor 604 in a load distributed printing print queue (basic print queue) and a backup job registration function of generating backup job information corresponding to the print job information registered in the load distributed printing print queue and registering the backup job information in a backup print queue.

A job control function of managing each of the load distributed printing print queues and backup print queues, for a print queue in which print job information has been registered, preferentially scheduling up the print job information (transmitting print data corresponding to the print job information to the print device corresponding to the print queue), and for a print queue in which no print job information but only backup job information is registered, changing the backup job information to print job information and transmitting print data to a corresponding print device.

A delete function of, when one of pieces of registered print job information and corresponding backup job information in the load distributed printing print queues and backup print queues is transmitted to a print device, deleting pieces of print job information which have not been transmitted and corresponding backup job information from all print queues.

A print manager 609 is a program which provides a user interface through which the user checks the state of a print job in the job control print service 605 or operates the print job. The print manager 609 transmits/receives information and instructions to/from the job control print service 605 via the software interface (API: Application Program Interface) of the job control print service 605.

The print manager 609 has a function of acquiring, as an event, the state information of the network printers 102 to 104 managed by the job control print service 605. Assumed event notifications are error/warning information notifications such as toner level warning, communication error between the client and device, memory shortage, and full load on the paper output tray, and normal information notifications such as return from an error state to a normal state. In this case, the job control print service 605 has a function of monitoring statuses such as the power control state and error information (paper jam) during printing execution by each print device communicable through the network.

As more detailed processing, the print manager 609 issues an event with a device designated to the job control print service 605. The job control print service 605 monitors the status of the device based on the issued event and notifies the print manager 609 of the monitoring result.

A management console 610 can monitor the whole print server 101 or client 107 or 108 by transmitting/receiving information and instructions to/from the job control print service 605 via an API for access by software.

The job control print service 605 explicitly indicates a function of communicating with the network printers 102 to 104 by using a device information control module 606 and acquiring information about a print job or operation state in each printer. This function may be incorporated in the job control print service 605.

When a print function as the standard equipment of a general operating system is used without executing load distributed printing, a PDL file generated by the PDL driver 602 is transferred from the spooler 603 to the job control port monitor 608 (arrow e) and then to the network printers 102 to 104 (arrow f).

A modification of the system described with reference to FIG. 6A will be described next with reference to FIG. 6B. FIG. 6B shows an example in which the functions necessary for load distributed printing are implemented by causing the client 107 or 108 and server 101 to share the functions in cooperation with each other. More specifically, FIG. 6B shows the flow of data when print server 101 executes scheduling for print job information which is created by the client 107 or 108 and registered in a print queue on the side of the server 101. The same reference numerals as in FIG. 6A denote the same components in FIG. 6B.

In the system shown in FIG. 6B, the client 107 or 108 need not have the management console 610 or device information control module 606. Instead, the server 101 has the management console 610 and device information control module 606, thereby managing the device information of the print devices collectively. The server 101 also has a job control server 612. The print server 101 communicates with the print devices 102 to 104 by using the device information control module 606 to acquire information about a print job or operation state in each printer or execute an operation. The acquired information can be transferred to the job control print service 605 and shared.

The job control server 612 executes concentrated control (scheduling) of print job transmission timings from the job control print service 605 on the client 107 or 108 to the print devices 102 to 104. The job control server 612 basically has the same functions as those of the job control print service 605 and logically shares job information with the job control print service 605. Job information indicates various kinds of attribute information of a print job, including the name of the document to be printed, the ID of the print job, and the name of the printer to which the print job has been output.

That is, the print job sequence management function (load distributed printing control function) described with reference to FIG. 6A may be arranged in only the server 101 in FIG. 6B. The job control server 612 notifies the job control print service 605 of the sequence and target print device of output of print jobs which are generated by the client 107 or 108 and temporarily held. The job control print service 605 transfers each print job to the network printers 102 to 104 in accordance with an instruction from the job control server 612.

In the above-described software configuration, in the print system shown in FIG. 6A, the job control port monitor 604, job control print service 605, print manager 609, and management console 610 are contained in the print control program. In the client 107 or 108 shown in FIG. 6B, the job control port monitor 604, job control print service 605, and print manager 609 are contained in the print control program. In the print server 101, the device information control module 606, management console 610, and job control server 612 are contained in the print control program.

The software configuration of the print system is not limited to FIGS. 6A and 6B. The present invention can also be implemented by any other arrangement. For example, the client may have only the components from the application 601 to the job control port monitor 604 while the server 101 may have the job control print service 605, print manager 609, management console 610, and device information control module 606.

<Flow of Print Job>

The flow of a print job from the application 601 to a print device will be described next with reference to FIG. 7. The same reference numerals as in FIG. 6A denote the same software components in FIG. 7, and a detailed description of their functions will be omitted.

Figure 7:
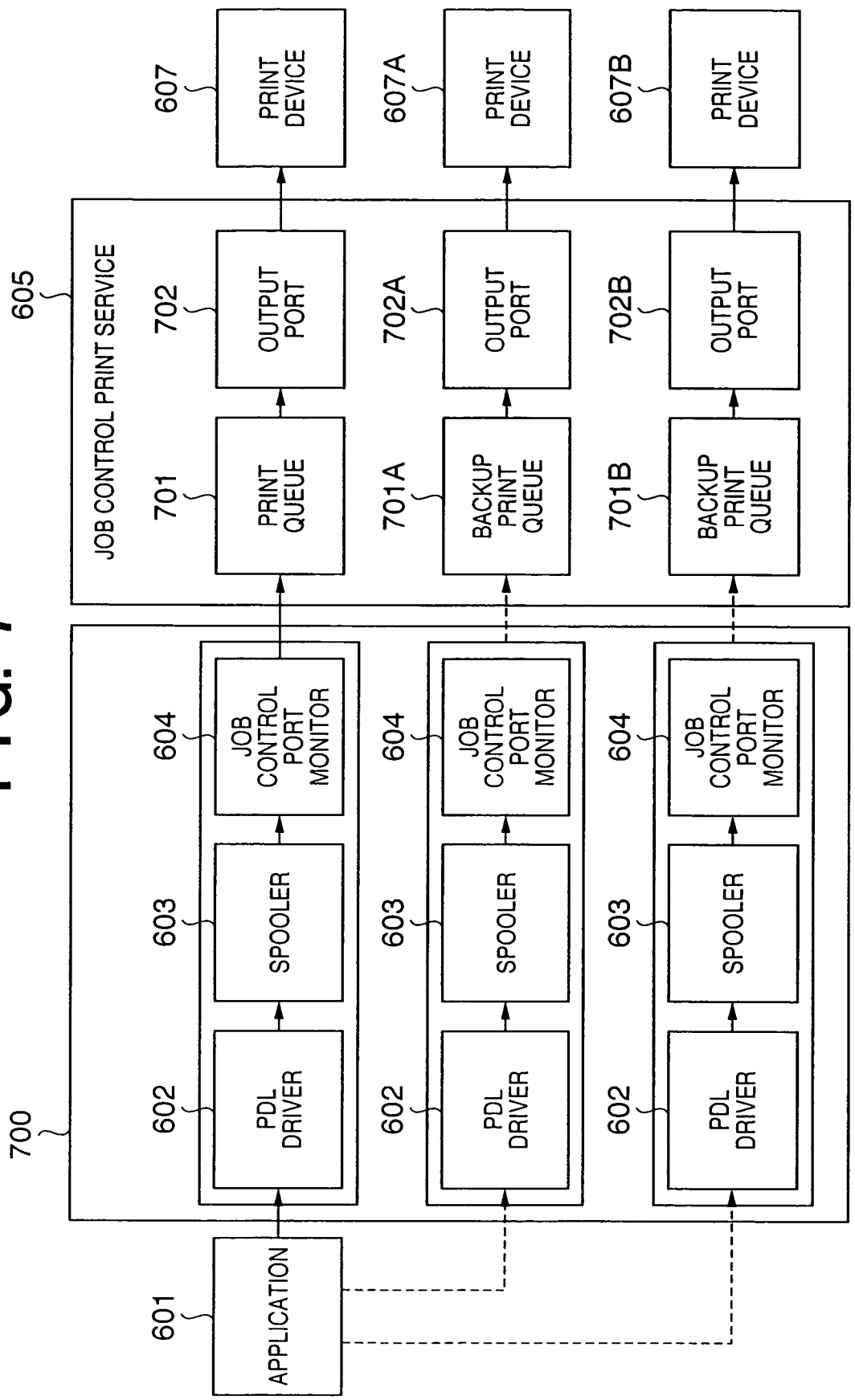
FIG. 7 is a block diagram showing the flow of print jobs in load distributed printing.

As shown in FIG. 7, conceptually, the PDL driver 602, spooler 603, and job control port monitor 604 are prepared for each of the print devices 102 to 104. If the OS is Windows, these components may be called a Windows print system 700 as a whole.

The job control print service 605 includes print queues 701, 701A, and 701B and output ports 702, 702A, and 702B which are equal in number to the print devices 102 to 104. Each output port is associated with the IP address of a corresponding print device or a name (DNS: Domain Name System) used in name resolution. On the basis of the IP address or DNS, the job transmission destination is specified, and job transmission (output) is done. Print queues are classified into one print basic queue 701 to which a predetermined job is output and a plurality of print queues 701A and 701B. In this embodiment, a print queue is set for each print device as a physical apparatus. However, the present invention is not limited to this. A print queue may be set for each logical printer. More specifically, a logical printer is set in correspondence with a plurality of print devices, and one print queue is set for the logical printer. Alternatively, a plurality of logical printers are set in correspondence with one print device, and a print queue is set for each of the plurality of logical printers.

To execute load distributed printing, the application 601 designates a printer having load distributed printing setting and issues a print instruction. On the basis of the print instruction, a print job is generated by the PDL driver 602 and transferred from the job control port monitor 604 to the job control print service 605. The print job information is held in the print queue 701. Simultaneously, pieces of virtual job information corresponding to the print job information are generated in the print queues 701A and 701B. One of these print jobs is sent to the print devices 102 to 104. Print devices corresponding to the backup print queues are called backup printers which indicate spare print devices to be used when, e.g., the print device designated by the user is busy.

<Contents of Various Kinds of Information>

I. Real Job Queue and Virtual Job Queue in Print Queue

Figure 8:
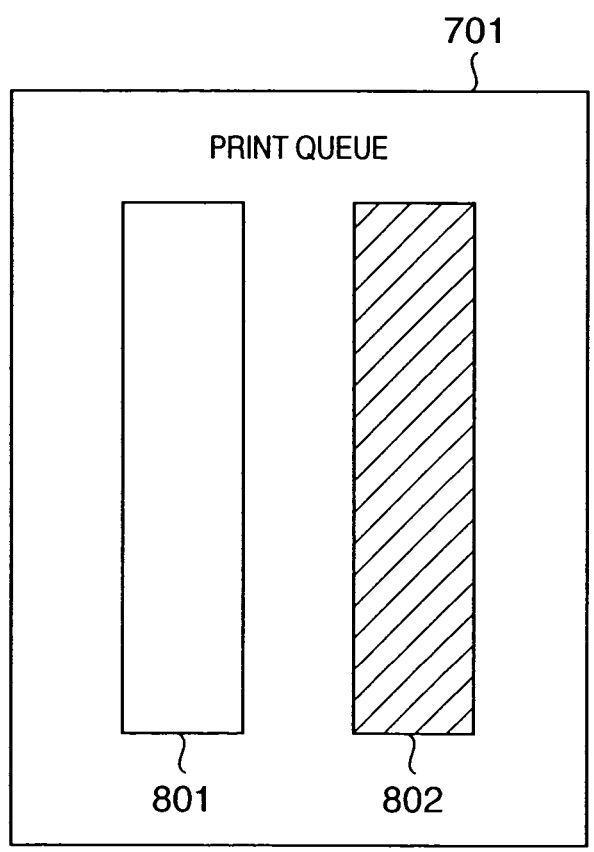
FIG. 8 is a view showing the relation between a print queue, a real job queue, and a virtual job queue.

FIG. 8 is a view showing a real job queue 801 and virtual job queue 802 in the print queue 701. The real job-queue 801 and virtual job queue 802 are queues which manage print job information and are used in load distributed print processing. A print queue containing a real job queue and virtual job queue as shown in FIG. 8 is made to correspond to each logical printer. If one logical printer corresponds to one print device, the print queue shown in FIG. 8 corresponds to one print device. This print queue functions as a basic print queue on one occasion and as a backup print queue on another occasion.

As described above, real job information is print job information which contains no print data itself but a link to print data such as a spool name. The real job information is managed by the real job queue. Virtual job information contains the link to the real job information (the ID of the real job information) but neither print data nor the link to the print data. The virtual job information is managed by the virtual job queue.

II. Print Queue Information

FIG. 9 is a view showing print queue information which determines the operation of the print job received by the print queue 701. The set contents of the print queue information, i.e., "printer name", "printer driver name", "print type", and "backup printer name" will be described. In the system form shown in FIG. 6A, the information shown in FIG. 9 is held by the job control print service 605. In the system form shown in FIG. 6B, the information shown in FIG. 9 is shared by the job control print service 605 and the job control server 612.

"Printer name" indicates the name of a printer object of Windows (registered trademark). Each printer object has a unique name so that each printer object can be identified. "Printer driver name" is the name of a printer driver set in the printer object. "Print type" is setting which determines the operation of the print job received by the print queue. "Backup printer name" is the name of a printer to be used in load distributed printing. When load distributed printing is set as the print type, and a print job is received by the print queue 701, the print job is moved to, of a plurality of backup printers set in the received print queue (to be referred to as a load distributed print queue hereinafter) and print queue information, a printer to which the print job can be transferred earlier, thereby executing processing for distributing the printing load among the plurality of printers.

III. Real Job Information

Figure 10:
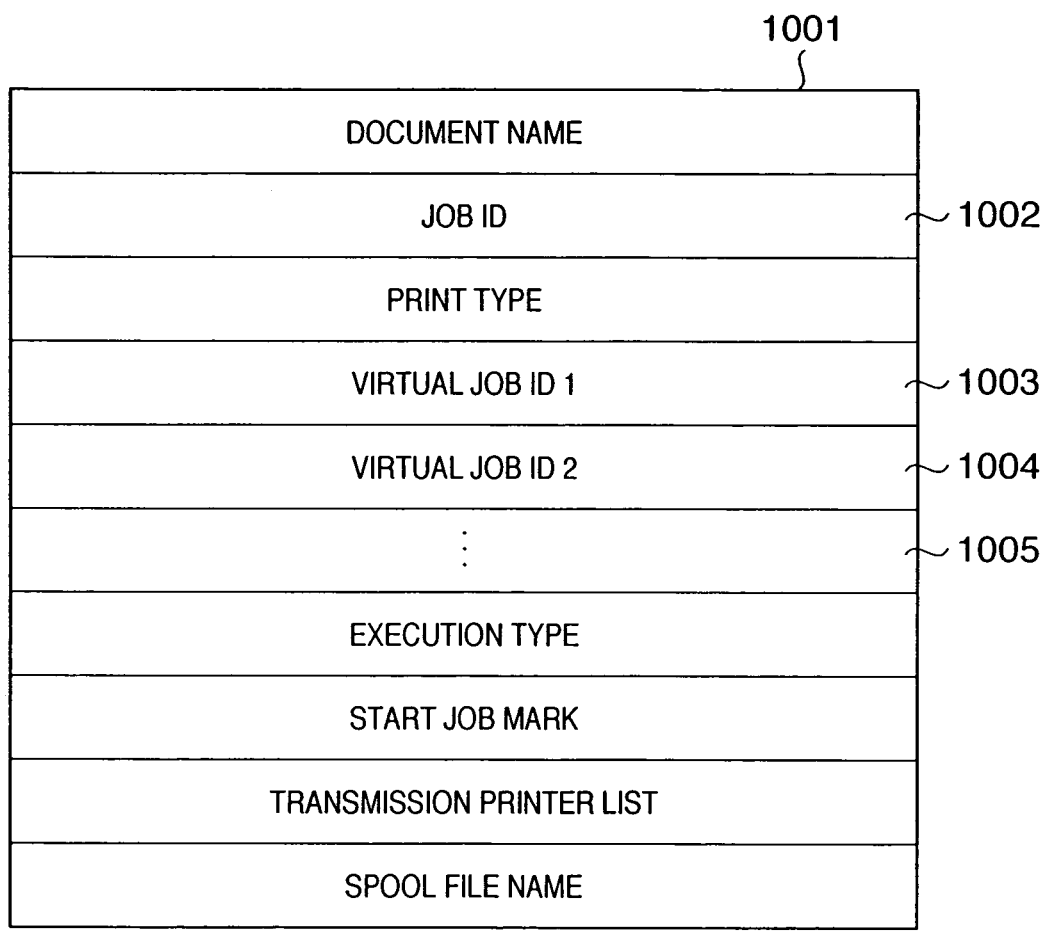
FIG. 10 is a view showing the contents of real job information.

FIG. 10 is a view showing print job information registered in the real job queue in the print queue 701. In the system form shown in FIG. 6A, the information-shown in FIG. 10 is held by the job control print service 605, like the information shown in FIG. 9. In the system form shown in FIG. 6B, the information shown in FIG. 10 is shared by the job control print service 605 and the job control server 612.

A real job is a print job containing print data spooled in a predetermined storage area. This print job is sent to the output port, subjected to actual transfer processing, and output by a printer. Real job information is various kinds of setting information contained in the real job and is registered in the print queue 701.

The set contents of the real job information (document name, job ID, print type, execution type, virtual job ID, start job mark, transmission printer list, and spool file name) will be described below.

"Document name" is the name of a job (print data file) to be printed by the application 701.

A job ID 1002 of the real job is an arbitrary ID assigned to each real job information to identify the job. Upon receiving a print job, the print queue 701 assigns a job ID to the job. The job ID 1002 corresponds to a job ID 1004 in FIG. 11 (to be described later).

"Print type"1006 is information which determines the operation of the real job, like the information in FIG. 9. Information such as load distributed printing is set. Upon receiving real job information, the print queue 701 acquires the information from the print type and sets it in the print type of the real job information.

"Execution type" is information representing the type of the print job. Examples of the type to be set are (1) password input job which inhibits printing unless a password is input in the network printers 102 to 104, (2) encrypted secure job, (3) offline job which sets an offline state immediately before output by the network printers 102 to 104, and (4) save job which is saved in the HDs of the network printers 102 to 104. This item is set when the job type notification is received from the printer driver or application. In some cases, the job type is discriminated and set.

Virtual job IDs 1003 to 1005 are job IDs of virtual jobs which are created in executing load distributed print processing. When a plurality of pieces of virtual job information are generated, a plurality of virtual job IDs are set. One of the Virtual job IDs 1003 to 1005 corresponds to a job ID 1102 in FIG. 11.

"Start job mark" represents the start of print jobs managed by the network printers 102 to 104.

In "transmission printer list", the names of printers to which real jobs are transmitted are set.

"Spool file name" is the name of a spool file corresponding to print data created on the basis of application data and is used to specify the spool file stored in a predetermined storage portion. A spool file ID may be employed in place of the spool file name. When job output based on real job information is done for a corresponding print device, print data which is specified on the basis of the spool file name related to the real job information is written to the output port so that the print data is output to the print device.

IV. Virtual Job Information

Figure 11:
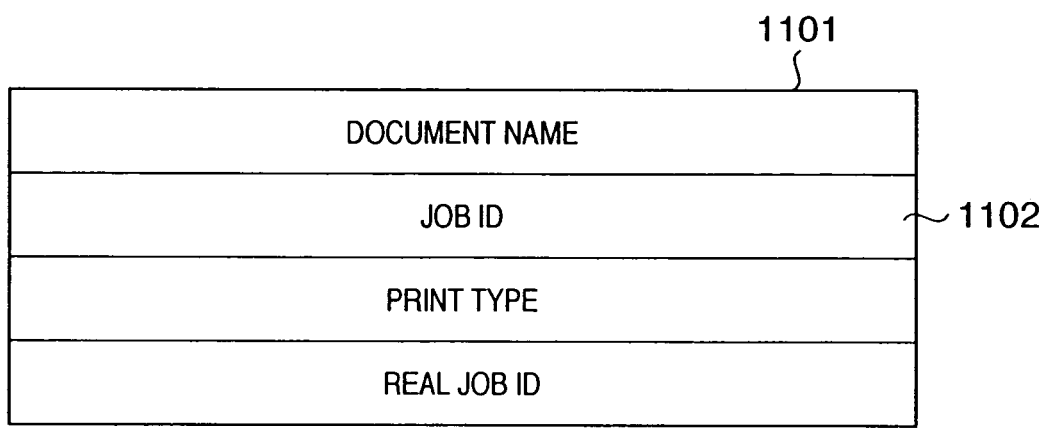
FIG. 11 is a view showing the contents of virtual job information.

FIG. 11 is a view showing virtual job information registered in the virtual job queue in the print queue 701. In the system form shown in FIG. 6A, the information shown in FIG. 11 is held by the job control print service 605, like the information shown in FIGS. 9 and 10. In the system form shown in FIG. 6B, the information shown in FIG. 10 is shared by the job control print service 605 and the job control server 612.

Virtual job information is associated with the real job information for load distribution and is necessary for schedule management in load distributed print processing.

The set contents of the virtual job information, i.e., "document name", "job ID", "print type", and "real job ID" will be described below.

"Document name" is the name of the printing target document of real job information corresponding to the virtual job information and is coped from the real job information in creating the virtual job information.

"Job ID" is an ID to identify the virtual job information and is set in creating the virtual job information.

"Print type" is the print type of a real job corresponding to the virtual job information and is coped from the print type of the real job information in creating the virtual job.

"Real job ID" is the ID of the real job information associated with the virtual job information and set in creating the virtual job information.

The information shown in FIG. 11 contains no spool file name to specify print data, which has been described with reference to FIG. 10. The spool file name may be contained in the virtual job information in advance, and in changing the real job information (to be described later), the spool file name associated in advance may be used.

<Load Distributed Processing>

In load distributed print processing according to this embodiment, real job information is generated in the print queue of the load distributed printer, and virtual jobs are generated in the backup print queues of the backup printers in accordance with the load distributed print setting of the printer to which a print instruction is issued from the application. Of the jobs, a print job having an early transfer start instruction (schedule up) is transferred to the print device.

Figure 12:
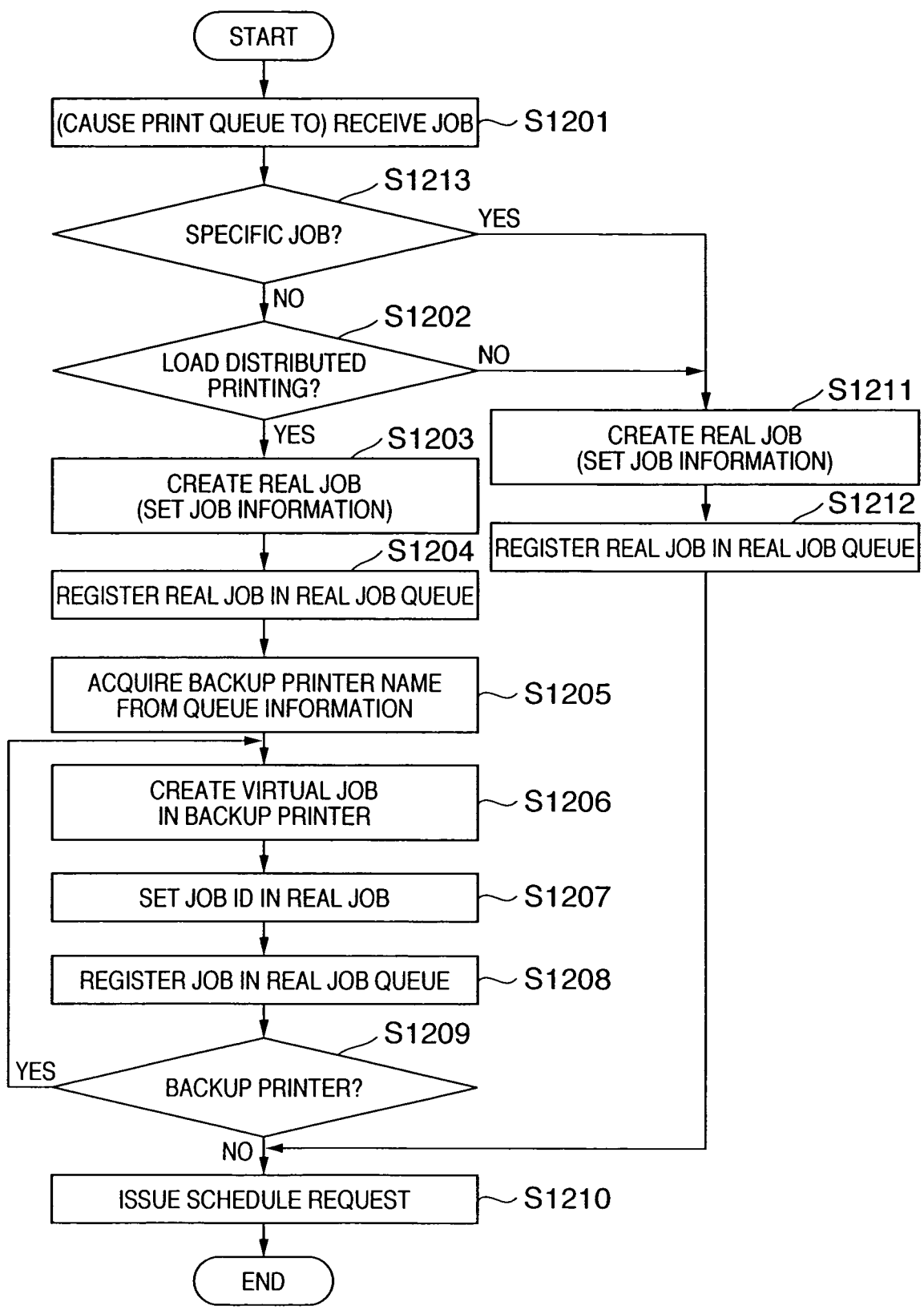
FIG. 12 is a flowchart showing the flow of processing for creating a virtual job upon receiving a print job.

FIG. 12 is a flowchart showing processing from job reception processing to virtual job creation in the load distributed print processing of this embodiment.

Figure 13:
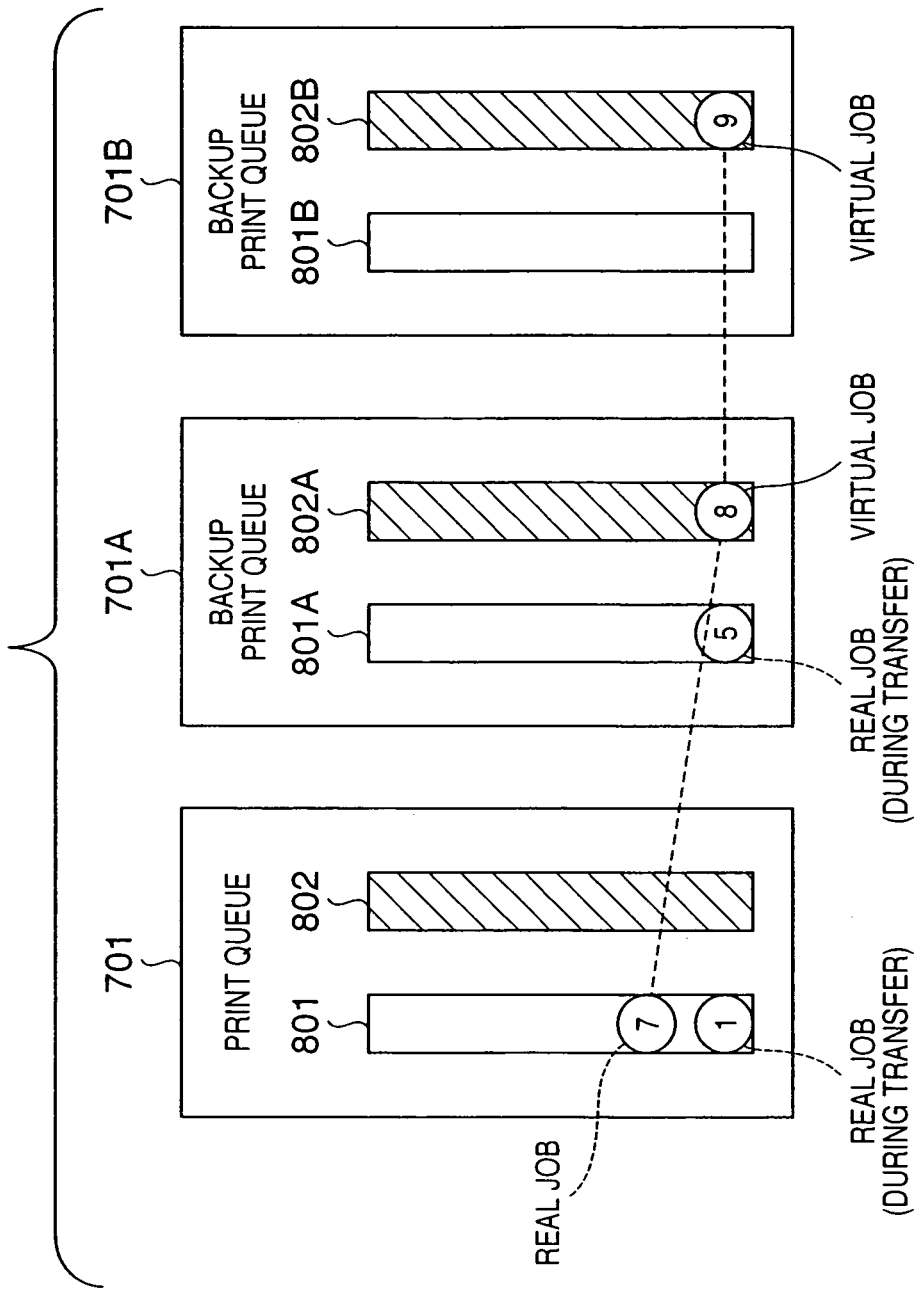
FIG. 13 is a view showing the relation between the real job and virtual job and the real job queue, virtual job queue, print queue, and backup print queue.

FIG. 13 is a view for explaining the processing in the flowchart shown in FIG. 12. Referring to FIG. 13, real job information having a job ID "1" is present in the real job queue 801 in the print queue 701. Real job information having a job ID "5" is present in a real job queue 801A in the backup print queue 701A corresponding to another print device. A description will be made assuming that print data corresponding to each real job information is being transferred to print devices. The real job information with the job ID "5" can be regarded as information which is registered, e.g., when a load distributed print instruction is issued from another client which sets the print device corresponding to the backup print queue 701A as the basic print device. In this case, the print queues 701 and 701B are used as backup print queues. Virtual job information is registered in the virtual job queue in each backup print queue.

When the application 601 starts printing, in step S1201, the print queue 701 receives a print job through the spooler 603 and job control port monitor 604.

Next, in step S1213, the type of print job is determined. It is determined on the basis of the execution type in the real job information whether virtual job information is to be created. If the print job can be received by only a specific network printer i.e., if the print job is a password input job which inhibits printing unless a password is input in the network printers 102 to 104, a secure job which is encrypted and can be printed by only a specific one of the network printers 102 to 104, an offline job which sets an offline state immediately before output by the network printers 102 to 104, or a save job which is saved in the HDs of the network printers 102 to 104, the processing advances to step S1211. Otherwise, the processing advances to step S1202.

In step S1202, it is confirmed by referring to the print type in the print queue information whether the processing is load distributed printing. If YES in step S1202, the processing advances to step S1203. If NO in step S1202, the processing advances to step S1211. In step S1203, of the plurality of print queues, a print queue corresponding to the print device set as a print job output target is set as the basic print queue. The real job information of the received print job is registered in the real job queue contained in the basic print queue.

As the document name, the name acquired when the job is received from the spooler 603 is set. The job ID is generated and set in creating the job information. As the print type, the information of print type in the print queue information is set.

In this embodiment, the print type in the print queue information is load distributed printing. Hence, load distributed printing is set as the print type in the real job information. In step S1204, the created real job information is registered in the real job queue 801 in the print queue 701 (the job with the job ID "7" shown in FIG. 13). In step S1205, the backup printer name in the print queue information is acquired. If a plurality of backup printers are set, a plurality of backup printer names are acquired. Print queues corresponding to the backup printers are set as backup print queues.

In step S1206, virtual job information is created in the order of backup print queues specified from the plurality of acquired backup printer names, and each information is set.

The document name is set by acquiring information from the document name in the real job information. The job ID is generated and set in creating the virtual job information. The print type is acquired from the information of the print type in the real job information and set. The real job ID is acquired from the job ID of the real job information and set.

In step S1207, the job ID of the virtual job information is set as the virtual job ID in the real job information. Since a plurality of virtual jobs may be generated, virtual job ID 1, virtual job ID 2, . . . are set in the order of virtual job creation.

In step S1208, the virtual job information is registered in a virtual job queue 802A (a job with an job ID "8" shown in FIG. 13).

If it is determined in step S1209 that a backup printer (backup print queue) acquired in step S1205 still remains, the processing returns to step S1206.

Referring to FIG. 13, it is assumed that two backup printers are acquired in step S1205. Hence, two pieces of virtual job information are created. Virtual jobs with job IDs "8" and "9" are created in the virtual job queues 802A and 802B, respectively. The job IDs "8" and "9" are set in the pieces of virtual job information associated with the real job information of the real job (job ID "7"). In addition, "7" is set as real job IDs in the pieces of virtual job information with the job IDs "8" and "9".

If NO in step S1209, the processing advances to step S1210 to issue schedule requests of the created real job and all virtual jobs.

Figure 14:
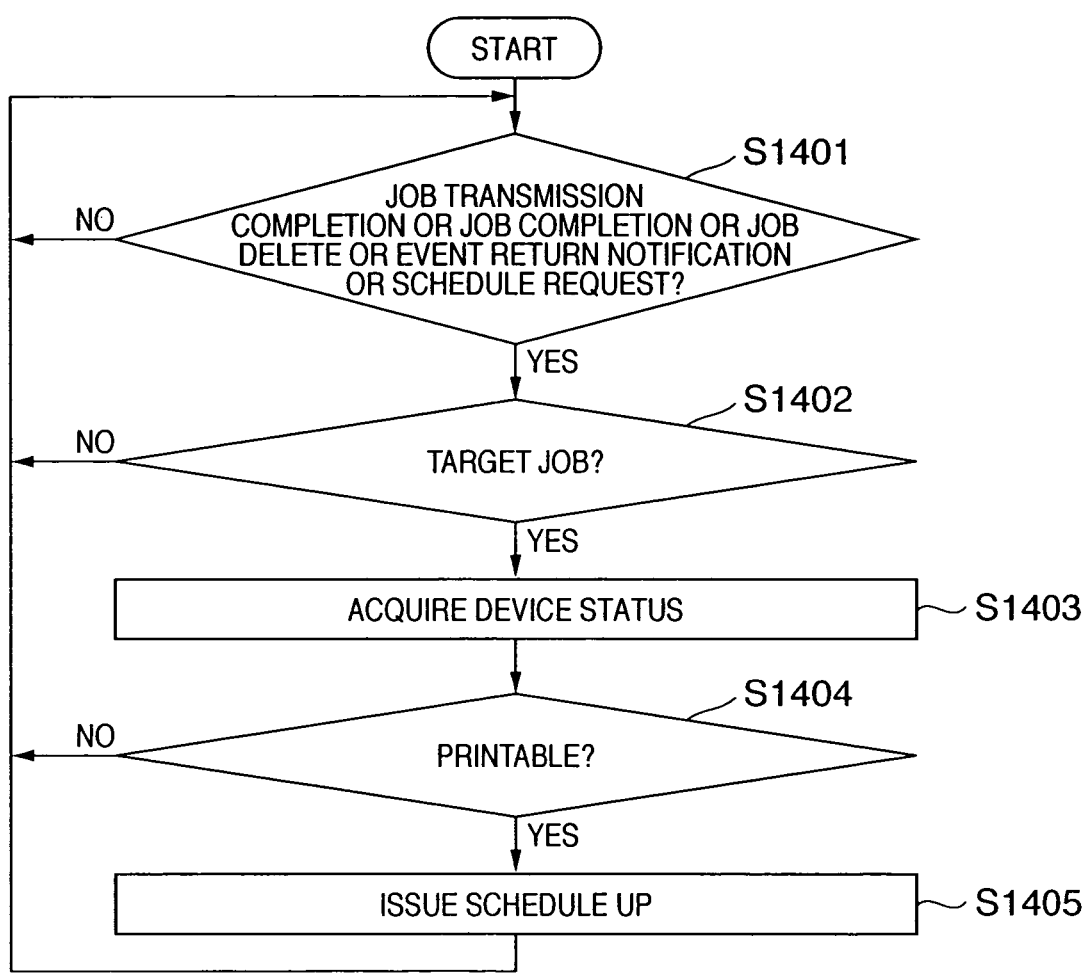
FIG. 14 is a flowchart showing processing of schedule up.

FIG. 14 is a flowchart showing schedule processing for actions issued in the print queues 701, 701A, and 701B. This corresponds to processing in the job control print service 605.

In step S1401, the schedule of each print queue is managed. Actions such as a schedule request from a module (e.g., a job control port monitor) which has registered a print job in a print queue, print job transmission completion (information representing the end of print data transmission from an output port to a print device), print job delete, print job completion (last page output notification), device return notification (e.g., an event representing that an inoperable state has returned to an operable state when a power-off state has changed to a power-on state) are monitored. When an action occurs for a print queue, the processing advances to step S1402. If no action occurs, standby processing is executed in step S1401. A schedule request action is generated from, e.g., a job control port monitor. A print job delete is generated from the print manager 609. A print job transmission completion or print job completion is generated from a print device and notified through an output port. However, the action generation routes are not limited to those described above.

In step S1402, the print queue 701, 701A, or 701B for which the action has occurred is confirmed. The real job queues 801, 801A, 801B, and virtual job queues 802, 802A, and 802B are searched in this order. If print job information is present in a print queue the processing advances to step S1403. If no print job information is present, the processing returns to step S1401.

In step S1403, of the network printers 102 to 104, the operation status of a network printer corresponding to the print queue for which a predetermined action has occurred in step S1401 is acquired. For example, the status is acquired in accordance with a print job completion action.

In device status acquisition in step S1403, polling through the device information control module 606 may be executed. When both polling and device status acquisition according to occurrence of a predetermined action are used, it can more quickly be checked whether the print device has a transferable operation status.

In step S1404, it is determined on the basis of the status acquired in step S1403 whether print data can be transferred to the network printer corresponding to the current target print queue. Examples of operation statuses which are determined as data transfer disable states are (1) a state wherein expendables such as paper and toner run short or out, (2) a state wherein an error such as jam (paper jam) which inhibits continuation of image printing has occurred, (3) a state wherein the channel to transmit print data is in an offline state, and (4) a state wherein the printer side (including a network board) is busy because of shortage of the reception buffer capacity. The statuses (1) to (4) may arbitrarily be combined, and the combined status may be determined as a data transfer disable state.

If it is determined in step S1404 that print data can be transferred to the network printer as the action generation target, the processing advances to step S1405. If NO in step S1404, the processing returns to step S1401.

In step S1405, a schedule up request is issued to the job detected in step S1402. The processing returns to step S1401. At this time, if a real job is detected, a schedule up request is issued to the real job earlier than a virtual job. That is, higher priority is given to a real job than a virtual job independently of the registration order.

For example, assume that when a schedule request for a print job B is generated in step S1401, a preceding print job (print job A) is being transferred. In this case, NO in step S1404, and the processing returns to step S1401 to set the standby state. After that, when a job transmission completion or job delete of the print job A is received in step S1401, the processing advances for step S1402 to step S1405 to immediately start transferring the job B.

Figure 15:
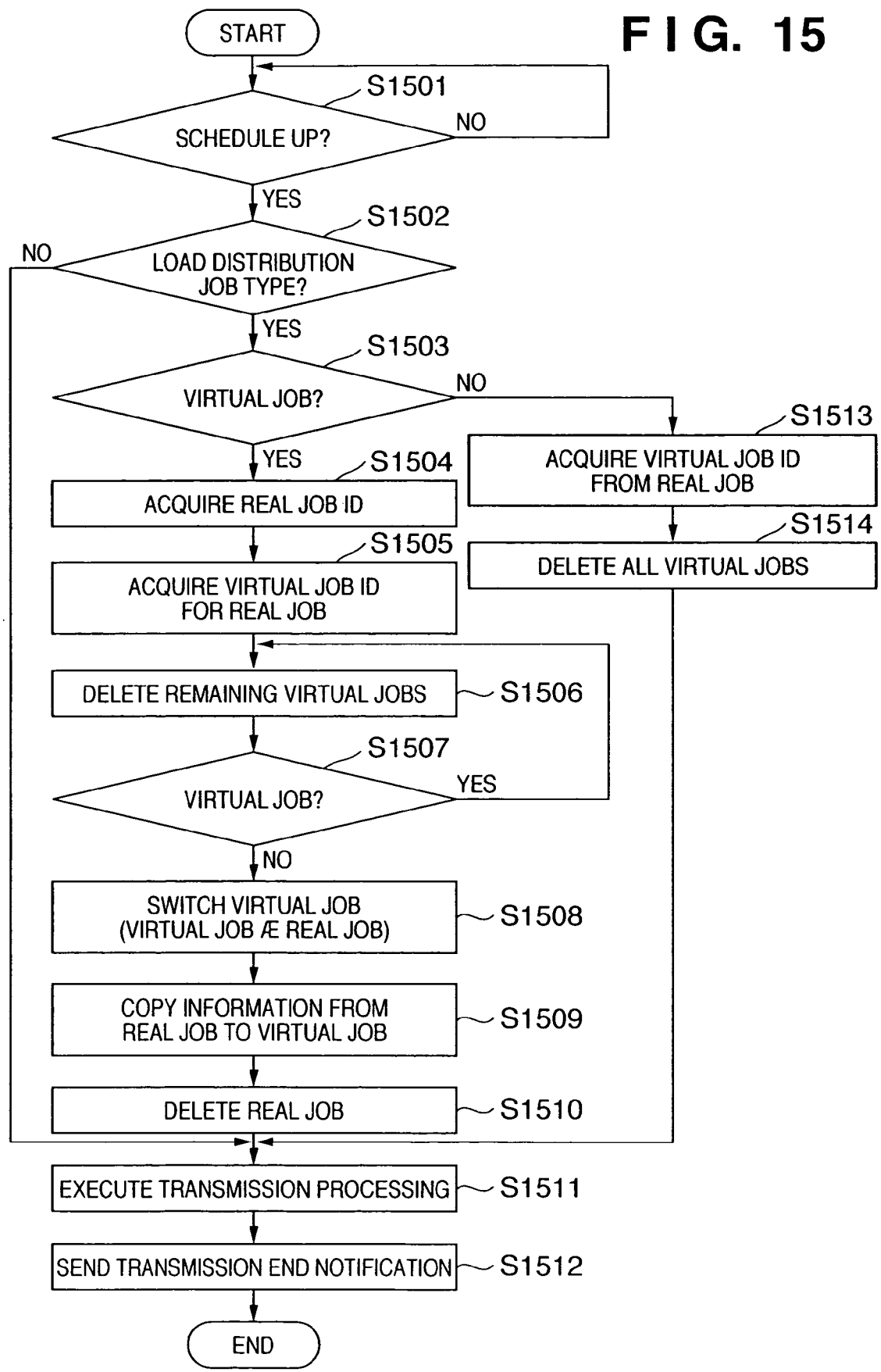
FIG. 15 is a flowchart showing processing from schedule up to printing.
Figure 16:
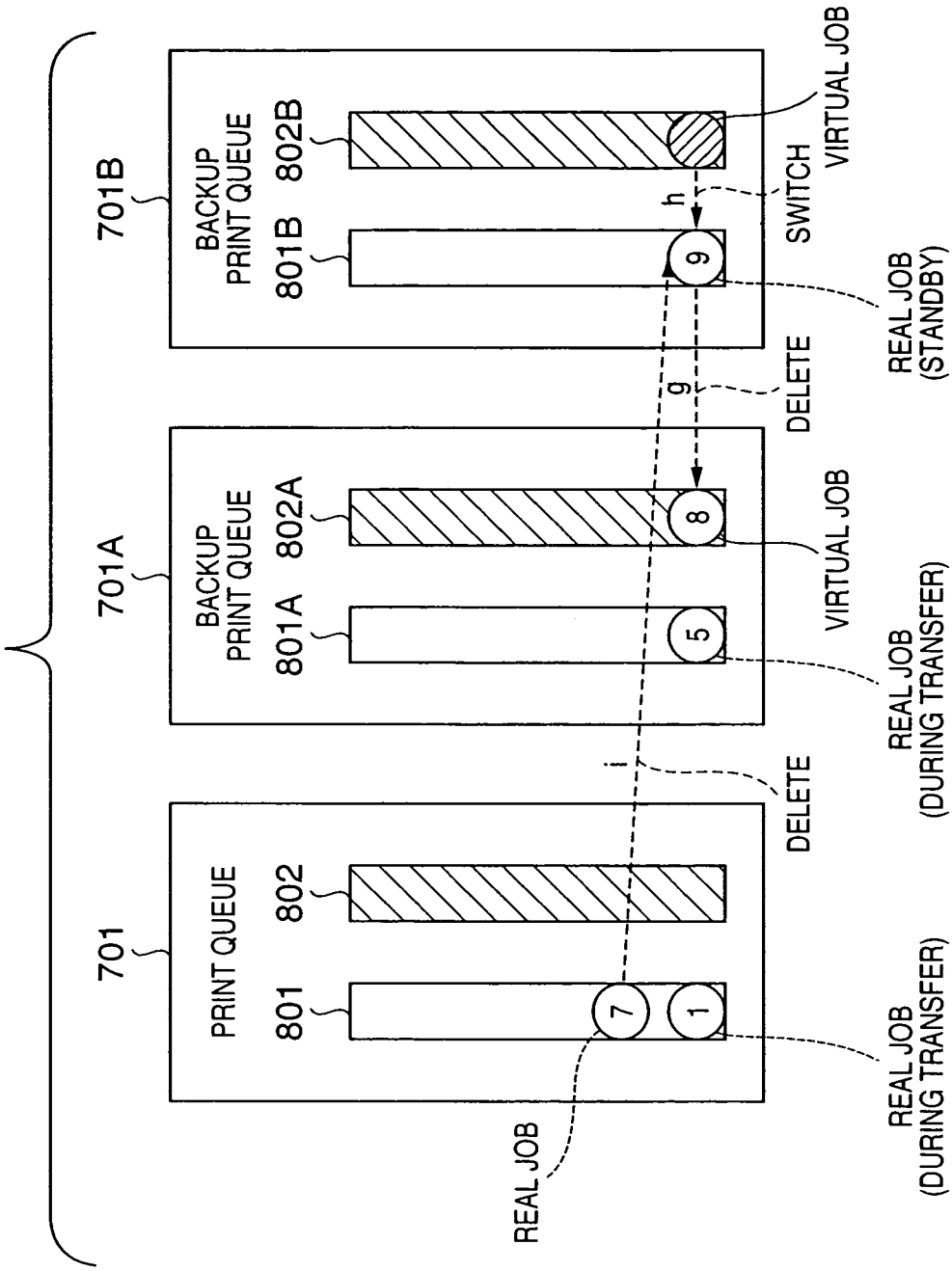
FIG. 16 is a view showing the relation between the real job and virtual job and the real job queue, virtual job queue, print queue, and backup print queue.

The flow of processing after schedule up request reception by the print queue 701 to print data transmission to the network printers 102 to 104 will especially be described on the basis of the processing of the flowchart shown in FIG. 14. FIG. 15 is a flowchart showing load distributed print processing in the print queue 701. FIGS. 16 and 17 are views showing processing related to the flowchart shown in FIG. 15.

In load distributed printing, a real job is registered in the real job queue of a preset parent printer, and a virtual job is registered in the virtual job queue of a backup printer. Of the jobs in one print queue, a print job which has received a schedule up request at the earliest timing is transferred to the network printers 102 to 104.

In step S1501, it is determined whether a schedule request (schedule up) is received. If YES in step S1501, the processing advances to step S1502. If NO in step S1501, a standby state is set in step S1501.

In step S1502, it is determined whether the print job which has received the schedule up request is a load distribution job. The print type information in the job information is acquired. If the print type is load distributed printing, the processing advances to step S1503. If NO in step S1502, the processing advances to step S1511 to transfer a print job based on the real job information registered in the real job queue to a network printer.

In step S1503, it is determined whether the schedule up job is a virtual job or a real job. If the job is a virtual job, the processing advances to step S1504. If the job is a real job, the processing advances to step S1513.

The user may be notified of the schedule up of the virtual job. More specifically, when the user is notified that printing is executed not by the load distributed print device designated by him/her but by a backup print device, he/she can specify the printer which outputs the printing result, resulting in convenience.

In step S1504, the real job ID in the virtual job information is acquired to refer to the real job information. In step S1505, the real job information is referred to by using the real job ID acquired in step S1504, and virtual job IDs contained in the real job information are acquired.

In step S1506, remaining virtual jobs having the same contents as the virtual job for which the schedule up request has been generated are recognized on the basis of the virtual job IDs acquired in step S1505. The remaining virtual jobs which have not received the schedule up request and not transmitted are sequentially deleted (arrow g in FIG. 16).

If it is determined in step S1507 that a virtual job which is acquired in step S1505 is not deleted in step S1506 and still remains, the processing returns to step S1506. If NO in step S1507, the processing advances to step S1508. Accordingly, all remaining virtual jobs having the same contents as the virtual job for which the schedule up request has been generated are deleted.

In steps S1508 and S1509, the virtual job for which the schedule up request has been generated is changed to a real job. By this change processing, the virtual job information changes to real job information. The print job corresponding to the real job information before change is not transmitted.

First, in step S1508, virtual job information is registered in the real job queue 801B (arrow h in FIG. 16). At this time, all pieces of virtual job information related to the print job as the operation target are eliminated. In step S1509, the corresponding real job (the real job with the real job ID "7" registered in the print queue 701) is specified on the basis of the real job ID in the virtual job information. The real job information is acquired and copied to the virtual job information (ID "9") in the real job queue 801B. At this time, a real job with an ID "9" is stored in the real job queue 801B.

In step S1510, the real job (the real job information with the real job ID "7" registered in the print queue 701) registered in the real job ID in the virtual job information for which the schedule up request has been generated is deleted (arrow i in FIG. 16). As a result of these processing operations, the state shown in FIG. 17 is obtained. In step S1511, the print job which has been a real job before or the print job which has been changed to a real job is transferred to a corresponding network printer. This will be described in more detail. Print data having a spool file name specified from the real job information (real job information determined as NO in step S1503 or real job information switched in step S1509) shown in FIG. 10, which is an ultimate target, is transferred on the basis of the IP address associated with the output port of the logical printer corresponding to the real job queue in which the real job information is registered or the name to be used in name solution.

When print job transfer is ended, a job transmission end notification is sent in step S1512. Until the processing indicated by the arrow i in FIG. 16 is ended, two real jobs are present. However, when the processing from the arrow g to arrow i in FIG. 16 is implemented by a unicursal program (a program which generates no context change), no problem rises. The order of processing operations indicated by the arrows i and h may be reversed. In the above description, unnecessary virtual job information and real job information are deleted. For example, unnecessary virtual job information may be added a flag representing it, and the job information with the added flag may be transmitted to a corresponding print device. Then, the flag may be referred to, and the received print job information may be discarded on the printer side.

If, of the real job and the plurality of virtual jobs generated by load distributed processing, the job which has received the schedule up is the real job, the processing advances from step S1503 to step S1513. In step S1513, all pieces of virtual job information are acquired from the real job information. In step S1514, all pieces of virtual job information are deleted. In step S1511, the real job which has received the schedule up is transferred to the corresponding network printer. As described above, the real job or virtual jobs are deleted in step S1506 or S1514. Instead, only pieces of print job information corresponding to remaining print jobs (real jobs or virtual jobs) which have not received the schedule up request may be transferred to the network printer and deleted on it.

If it is determined in step S1502 that the print type of the print job which has received the schedule up is not load distributed printing, the processing advances to step S1511 to transfer the print job to the network printer.

In this embodiment, a spool job may be transferred to a uniquely created transmission output port. Alternatively, a print job may be transferred to a transmission output port prepared in the operating system.

To display a plurality of print queues as shown in FIG. 13 on the display by using, e.g., the print manager 609 shown in FIG. 6A or 6B, virtual job information registered in a virtual job queue is not displayed, and only real job information registered in a real job queue is selectively displayed.

When a print job execution state request is sent from the print manager 609 to the job control print service 605 through the API, the job control print service 605 extracts the real job information registered in the real job queue on the basis of the real job information registered in the real job queue and virtual job information registered in the virtual job queue. The print manager 609 is notified of the extracted real job information, and the print job execution state based on the notified real job information is displayed. That is, since the user is notified of only the real job information, he/she is not confused.

The print job execution state may be displayed on the basis of an active notification from the job control print service 605 to the print manager 609. Alternatively, the job control print service 605 may notify the print manager 609 of both the real job information and virtual job information so that the print manager 609 extracts the real job information.

FIG. 18 shows a setting window to make a logical printer corresponding to a backup print queue associate with a logical printer corresponding to the basic print queue. The window shown in FIG. 18 is displayed to create or add a new logical printer. The window may be displayed to change setting of an already created logical printer.

A logical printer name is input to an input field 1801. The user can arbitrarily designate the name through the keyboard.

A printer driver name is displayed in a display field 1802. When a "select driver" button is selected, the list of a plurality of printer drivers which can be selected by the user is displayed. The name of a printer driver selected from the list is displayed in the display field 1802.

A "select port" button 1806 is used to display a select window on which a port to be associated with the printer driver is selected. When the "select port" button 1806 is selected, a plurality of ports registered in the system are presented in a selectable form.

In a select field 1803 the output method of the logical printer is selected. In this select field, "load distributed printing" can be designed as the output method.

In a display field 1804, the list of backup printers (the backup printers correspond to, e.g., the backup print queues 701A and 701B in FIG. 13) corresponding to the predetermined logical printer set in the fields 1801 and 1806 is displayed. A "set backup printer" button 1805 is used to set a backup printer. When the "set backup printer" button 1805 is selected, the list of logical printers which can be set as a backup printer is displayed. A logical printer selected from the list is set as a backup printer and displayed in the backup printer list display field 1804. When the "set backup printer" button 1805 is selected, only printers which are compatible with the printer model or printer language specified by the designated printer driver may be displayed as a list. In this case, the user can efficiently select an appropriate backup printer.

The setting information set on the window shown in FIG. 18 is reflected on the information items shown in FIGS. 9, 10, and 11. That is, the window shown in FIG. 18 apparently serves as a setting window to set the relationship between logical printers. The set contents on the setting window consequently set the relationship between print queues. Hence, the window shown in FIG. 18 can be regarded as a setting window to make backup print queues correspond to the basic print queue.

As described above, in this embodiment, when an application executes printing by using a load distributed printer, a real job is created in a print queue corresponding to the printer set for load distribution, and a virtual job is created in a print queue corresponding to a backup printer. Of these pieces of job information, a job which has received a schedule up at the earliest timing is transferred to a network printer as a real job. For this reason, of a plurality of network printers, a network printer which is set in a transferable state at the earliest timing can efficiently be selected to transfer the print job. As a result, a number of print jobs can efficiently be processed by the plurality of network printers. While print jobs are present, the plurality of network printers can be used in full operation.

In addition, the memory capacity and the load on memory processing can be reduced because identical print data need not redundantly be registered in a plurality of queues. Since no virtual job information is displayed, a plurality of identical print data never temporarily occupy the queues, and the user is never confused. Furthermore, since no special queue called a common print queue need be set on the system, the user can execute load distributed printing by executing printing in the same way as before. The user can efficiently use the plurality of print devices without adding complex functions to a print application.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2003-401953 filed on Dec. 1, 2003, which is hereby incorporated by reference herein.

What is claimed is:

1. An information processing apparatus, comprising:
a plurality of print queues, including a real job queue and a virtual job queue for each of a plurality of printing apparatus;
registration means for registering print job information of a print job in a real job queue of a first printing apparatus and registering virtual job information in a virtual job queue of a second printing apparatus, wherein the virtual job information represents the same print job and contains a reference link to the print job information; and job control means for,
  (a) when the print job information registered in the real job queue of the first printing apparatus is at the top of the queue,
    (a1) deleting the virtual job information registered in the virtual job queue of the second printing apparatus, and
    (a2) executing the print job on the first printing apparatus based on the print job information registered in the real job queue of the first printing apparatus, and
  (b) when the virtual job information registered in the virtual job queue of the second printing apparatus is at the top of the queue,
    (b1) specifying the print job information registered in the real job queue of the first printing apparatus to which the virtual job information registered in the virtual job queue of the second printing apparatus contains a reference link,
    (b2) converting the virtual job information to print job information, based on the print job information to which the virtual job information contains a reference link,
    (b3) re-registering the print job information converted from the virtual job information in a real job queue of the second printing apparatus, and
    (b4) executing the print job on the second printing apparatus based on the print job information re-registered in the real job queue of the second printing apparatus, without executing the print job on the first printing apparatus based on the print job information registered in the real job queue of the first printing apparatus.

2. The apparatus according to claim 1, further comprising display means for executing display based on print job information registered in a real job queue without executing display based on virtual job information registered in a virtual job queue.

3. The apparatus according to claim 2, further comprising extraction means for extracting job information from print job information registered in a real job queue and virtual job information registered in a virtual job queue,
wherein said display means executes display based on the job information extracted by said extraction means.

4. A load distributed printing method, comprising:
a setting step of setting up a plurality of print queues, including a real job queue and a virtual job queue for each of a plurality of printing apparatus;
a registration step of registering print job information of a print job in a real job queue of a first printing apparatus and registering virtual job information in a virtual job queue of a second printing apparatus, wherein the virtual job information represents the same print job and contains a reference link to the print job information; and
a job control step of,
  (a) when the print job information registered in the real job queue of the first printing apparatus is at the top of the queue,
    (a1) deleting the virtual job information registered in the virtual job queue of the second printing apparatus, and
    (a2) executing the print job on the first printing apparatus based on the print job information registered in the real job queue of the first printing apparatus, and
  (b) when the virtual job information registered in the virtual job queue of the second printing apparatus is at the top of the queue,
    (b1) specifying the print job information registered in the real job queue of the first printing apparatus to which the virtual job information registered in the virtual job queue of the second printing apparatus contains a reference link,
    (b2) converting the virtual job information registered in the virtual job queue of the second printing apparatus to print job information, based on the print job information to which the virtual job information contains a reference link,
    (b3) re-registering the print job information converted from the virtual job information in a real job queue of the second printing apparatus, and
    (b4) executing the print job on the second printing apparatus based on the print job information re-registered in the real job queue of the second printing apparatus, without executing the print job on the first printing apparatus based on the print job information registered in the real job queue of the first printing apparatus.

5. The method according to claim 4, further comprising a display step of executing display based on print job information registered in a real job queue without executing display based on virtual job information registered in a virtual job queue.

6. The method according to claim 5, further comprising
an extraction step of extracting job information from print job information registered in a real job queue and virtual job information registered in a virtual job queue,
wherein, in said display step, display based on the job information extracted in said extraction step is executed.

7. A non-transitory computer-readable storage medium storing, in executable form, a program implementing a load distributed printing method, the method comprising:
a setting step of setting up a plurality of print queues, including a real job queue and a virtual job queue specifically for each of a plurality of printing apparatus;
a registration step of registering print job information of a print job in a real job queue of a first printing apparatus and registering virtual job information in a virtual job queue of a second printing apparatus, wherein the virtual job information represents the same print job and contains a reference link to the print job information; and
a job control step of,
  (a) when the print job information registered in the real job queue of the first printing apparatus is at the top of the queue,
    (a1) deleting the virtual job information registered in the virtual job queue of the second printing apparatus and
    (a2) executing the print job on the first printing apparatus based on the print job information registered in the real job queue of the first printing apparatus, and
  (b) when the virtual job information registered in the virtual job queue of the second printing apparatus is at the top of the queue,
    (b1) specifying the print job information registered in the real job queue of the first printing apparatus to which the virtual job information registered in the virtual job queue of the second printing apparatus contains a reference link,
    (b2) converting the virtual job information registered in the virtual job queue of the second printing apparatus to print job information, based on the print job information to which the virtual job information contains a reference link, (b3) re-registering the print job information converted from the virtual job information in a real job queue of the second printing apparatus, and (b4) executing the print job on the second printing apparatus based on the print job information re-registered in the real job queue of the second printing apparatus, without executing the print job on the first printing apparatus based on the print job information registered in the real job queue of the first printing apparatus.

8. The computer-readable storage medium according to claim 7, the method further comprising a display step of executing display based on print job information registered in a real job queue without executing display based on virtual job information registered in a virtual job queue.

9. The computer-readable storage medium according to claim 8, the method further comprising
an extraction step of extracting job information from print job information registered in a real job queue and virtual job information registered in a virtual job queue,
wherein, in said display step, display based on the job information extracted in said extraction step is executed.

10. A print system comprising:
an information processing apparatus of claim 1; and
a printing apparatus for printing data transmitted from said information processing apparatus.

11. A print system comprising a client computer, and a server computer which instructs the client computer to transfer a spooled print job to a predetermined printing apparatus among a plurality of printing apparatuses, wherein
the client computer comprises
print queue setting means for setting each of a plurality of print queues corresponding to the plurality of printing apparatuses as a basic print queue or a backup print queue,
print job registration means for registering print job information in a basic print queue of a first of the plurality of printing apparatus, and
backup job registration means for generating backup job information corresponding to the print job information registered in the basic print queue of the first printing apparatus and registering the backup job information in the backup print queue of a second of the plurality of printing apparatus;
wherein the server computer comprises
job control means for,
(a) when the print job information registered in the basic print queue of the first printing apparatus is at the top of the queue, instructing the client computer to preferentially
(a1) execute the print job on the first printing apparatus corresponding to the print job information in the basic print queue of the first printing apparatus, and
(b) when the backup job information registered in the backup print queue of the second printing apparatus is at the top of the queue, instructing the client computer to
(b1) specify the print job information registered in the basic print queue of the first printing apparatus to which the backup job information registered in the backup print queue of the second printing apparatus corresponds,
(b2) convert the backup job information to print job information of the print job, based on the print job information to which the back job information corresponds,
(b3) re-register the print job information converted from the virtual job information in a basic print queue of the second printing apparatus, and
(b4) execute the print job on the second printing apparatus corresponding to the print job information in the basic print queue of the second printing apparatus; and
wherein the client computer further comprises
deleting means for, after the print job is executed on one of the plurality of printing apparatus, deleting, from any basic print queue and backup print queue that is not on the printing apparatus, print job information and backup job information corresponding to the print job information.

* * * * *